(12) United States Patent
Shanbhogue et al.

(10) Patent No.: US 11,204,874 B2
(45) Date of Patent: *Dec. 21, 2021

(54) SECURE MEMORY REPARTITIONING TECHNOLOGIES

(71) Applicant: Intel Corporation, Santa Clara, CA (US)

(72) Inventors: Vedvyas Shanbhogue, Austin, TX (US); Krystof C. Zmudzinski, Forest Grove, OR (US); Carlos V. Rozas, Portland, OR (US); Francis X. McKeen, Portland, OR (US); Raghunandan Makaram, Northborough, MA (US); Ilya Alexandrovich, Haifa (IL); Ittai Anati, Haifa (IL); Meltem Ozsoy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/838,418

(22) Filed: Apr. 2, 2020

(65) Prior Publication Data

US 2020/0233807 A1 Jul. 23, 2020

Related U.S. Application Data

(63) Continuation of application No. 15/719,023, filed on Sep. 28, 2017, now Pat. No. 10,628,315.

(51) Int. Cl.
*G06F 12/0862* (2016.01)
*G06F 12/0846* (2016.01)
(Continued)

(52) U.S. Cl.
CPC ...... *G06F 12/0862* (2013.01); *G06F 12/0848* (2013.01); *G06F 12/1009* (2013.01);
(Continued)

(58) Field of Classification Search
CPC ............ G06F 12/0862; G06F 12/0848; G06F 12/1009; G06F 12/1027; G06F 12/1408;
(Continued)

(56) References Cited

U.S. PATENT DOCUMENTS 9,087,200 B2 * 7/2015 McKeen ................ G06F 21/72
9,875,189 B2 1/2018 Zmudzinski et al.
(Continued)

OTHER PUBLICATIONS

Non-Final Office Action, U.S. Appl. No. 15/719,023, dated Aug. 9, 2019, 10 pages.
(Continued)

*Primary Examiner* — Joseph P Hirl
*Assistant Examiner* — Stephen T Gundry
(74) *Attorney, Agent, or Firm* — Nicholson De Vos Webster & Elliott LLP

(57) ABSTRACT

Secure memory repartitioning technologies are described. Embodiments of the disclosure may include a processing device including a processor core and a memory controller coupled between the processor core and a memory device. The memory device includes a memory range including a section of convertible pages that are convertible to secure pages or non-secure pages. The processor core is to receive a non-secure access request to a page in the memory device, responsive to a determination, based on one or more secure state bits in one or more secure state bit arrays, that the page is a secure page, insert an abort page address into a translation lookaside buffer, and responsive to a determination, based on the one or more secure state bits in the one or more
(Continued)

secure state bit arrays, that the page is a non-secure page, insert the page into the translation lookaside buffer.

20 Claims, 24 Drawing Sheets

(51) Int. Cl.
    *G06F 12/1027*      (2016.01)
    *G06F 12/14*      (2006.01)
    *G06F 12/1009*      (2016.01)

(52) U.S. Cl.
    CPC ...... *G06F 12/1027* (2013.01); *G06F 12/1408* (2013.01); *G06F 2212/1052* (2013.01); *G06F 2212/282* (2013.01); *G06F 2212/602* (2013.01); *G06F 2212/65* (2013.01); *G06F 2212/68* (2013.01)

(58) Field of Classification Search
    CPC ....... G06F 2212/1052; G06F 2212/282; G06F 2212/602; G06F 2212/65; G06F 2212/68
    See application file for complete search history.

(56) References Cited

U.S. PATENT DOCUMENTS

| | | | |
|---|---|---|---|
| 10,282,306 B2* | 5/2019 | Zmudzinski | G06F 12/1036 |
| 2006/0095793 A1 | 5/2006 | Hall | |
| 2011/0202740 A1* | 8/2011 | Grisenthawaite | G06F 12/14 711/163 |
| 2011/0208935 A1 | 8/2011 | Grisenthwaite | |
| 2012/0331307 A1 | 12/2012 | Fernandez Gutierrez | |
| 2013/0159726 A1 | 6/2013 | McKeen | |
| 2013/0198853 A1* | 8/2013 | McKeen | G06F 21/72 726/26 |
| 2014/0020112 A1 | 1/2014 | Goodes | |
| 2015/0032946 A1* | 1/2015 | Goss | H04L 63/18 711/103 |
| 2015/0089173 A1* | 3/2015 | Chhabra | G06F 9/45558 711/163 |
| 2015/0120978 A1 | 4/2015 | Kalyanasundharam et al. | |
| 2015/0378941 A1* | 12/2015 | Rozas | G06F 21/00 710/267 |
| 2016/0085695 A1 | 3/2016 | Leslie-Hurd et al. | |
| 2016/0092702 A1 | 3/2016 | Durham et al. | |
| 2016/0364338 A1 | 12/2016 | Zmudzinski et al. | |
| 2016/0378664 A1* | 12/2016 | Leslie-Hurd | G06F 12/0882 711/118 |
| 2017/0083724 A1* | 3/2017 | Chhabra | G06F 12/1408 |
| 2017/0171194 A1 | 6/2017 | Durham et al. | |
| 2018/0067873 A1* | 3/2018 | Pikhur | G06F 12/1441 |
| 2018/0088976 A1* | 3/2018 | Leslie-Hurd | G06F 21/62 |
| 2018/0095894 A1* | 4/2018 | Leslie-Hurd | G06F 3/0604 |
| 2018/0113811 A1* | 4/2018 | Xing | G06F 12/1009 |
| 2018/0173645 A1* | 6/2018 | Parker | G06F 12/1036 |
| 2018/0203801 A1* | 7/2018 | Leslie-Hurd | G06F 12/1475 |
| 2018/0239713 A1* | 8/2018 | Zmudzinski | G06F 12/109 |
| 2018/0329829 A1 | 11/2018 | Zmudzinski et al. | |
| 2018/0365438 A1* | 12/2018 | Bhattacharyya | G06F 21/602 |
| 2019/0012273 A1 | 1/2019 | Leslie-Hurd et al. | |
| 2019/0034627 A1* | 1/2019 | Hall | G06F 9/45558 |
| 2019/0034628 A1 | 1/2019 | Hall et al. | |
| 2019/0042463 A1 | 2/2019 | Shanbhogue et al. | |
| 2019/0042466 A1 | 2/2019 | Khosravi et al. | |
| 2019/0095334 A1* | 3/2019 | Shanbhogue | G06F 12/0848 |
| 2019/0095345 A1 | 3/2019 | Zmudzinski et al. | |
| 2019/0095357 A1 | 3/2019 | Ozsoy et al. | |
| 2019/0102324 A1* | 4/2019 | Ozsoy | G06F 12/0831 |
| 2019/0147192 A1 | 5/2019 | Khosravi et al. | |
| 2019/0196982 A1 | 6/2019 | Rozas et al. | |
| 2019/0251257 A1 | 8/2019 | McKeen et al. | |

OTHER PUBLICATIONS

Notice of Allowance, U.S. Appl. No. 15/719,023, dated Dec. 3, 2019, 12 pages.

\* cited by examiner

SECURE MEMORY REPARTITIONING TECHNOLOGIES

RELATED APPLICATIONS

This application is a continuation of U.S. patent application Ser. No. 15/719,023, filed Sep. 28, 2017, which is hereby incorporated by reference in its entirety.

The present disclosure pertains to computer systems; more specifically, to secure memory repartitioning technologies in a computer system.

BACKGROUND

Modern processors are designed to protect sensitive data in memory from both hardware and software attacks. Some processors provide cryptographic mechanisms for encryption, integrity, and replay protection. Memory encryption protects the confidentiality of memory-resident data. On the other hand, integrity protection prevents an attacker from causing any hidden modifications to the ciphertext (i.e., encrypted data, as opposed to plaintext which is unencrypted data) in memory, and replay protection eliminates any undetected temporal substitution of the ciphertext. However, controlling access to pages in memory may include certain checks that result in performance overhead. There may be instances where application corrupts a page that is currently being accessed by a hardware component, thereby causing an undesirable result.

DESCRIPTION OF EMBODIMENTS

Figure 1:
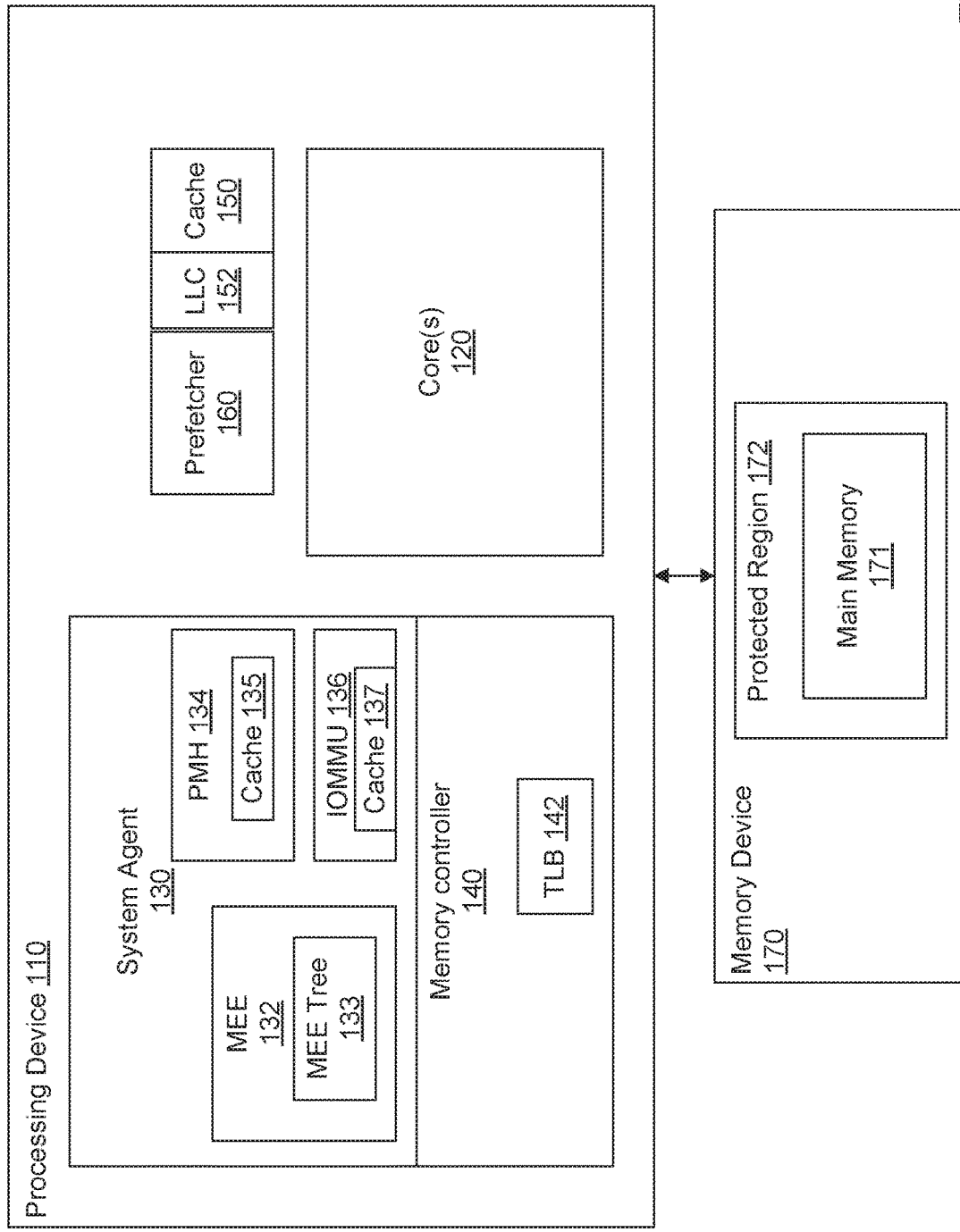
FIG. 1 is a block diagram illustrating a computing system for implementing secure memory according to one embodiment.

Secure memory repartitioning technologies are described. In particular, enhanced performance for access control to pages in memory may be provided by the disclosed techniques. Implementations of the disclosure also provide for robust system stability when applications request non-secure accesses to secure pages and when hardware components request secure accesses to non-secure pages. A processing device includes a processor core and a memory controller coupled between the processor core and a memory device. A memory range can include multiple sections of convertible pages that can be converted to secure pages or non-secure pages. Software executing on the processing device can identify a page in main memory to be converted and can use a page conversion instruction to convert the page. The processor core, in response to a page conversion instruction, can determine from the instruction the convertible page in the memory range to be converted, and convert the convertible page to be a secure page or a non-secure page. It is the responsibility of system software (e.g., OS or VMM) to identify a page that can be converted. For example, if the OS utilizes a non-secure page, it identifies a secure page (if a non-secure page is not available) and executes the page conversion instruction on this secure page. The memory range may also include multiple convertible sections (also referred to herein as hardware reserved sections) that can be converted in response to a section conversion instruction as described herein.

Memory encryption protects the confidentiality of memory-resident data. Memory encryption is primarily designed to protect against passive attacks where an attacker tries to silently observe the data lines as the data move on and off the data lines of the processing device die. Data lines may refer to an electrical line or circuit that carries data. Some processing devices include an encryption module that encrypts sensitive data before the data is stored into a protected region of the memory. On a memory read to the protected region, the data line is decrypted before being fed into the processing device. The encryption and decryption algorithms can be chosen based on the security level required by the user.

Secure containers, referred to herein as Secure Enclaves (SEs), may be created. The SEs are designed to protect third-party secrets from both hardware and software attacks. SE can protect the confidentiality of enclave secrets by ensuring that the enclave secrets are stored encrypted when resident in platform memory. In order to provide complete protection from hardware attacks, SEs provide integrity protection and replay protection. In the absence of such protections, an attacker with physical access to the system can record snapshots of enclave cache lines and replay them at a later point in time. In order to achieve these protections, SE employs a memory encryption engine (MEE), which provides cryptographic mechanisms for encryption, integrity, and replay protection. The MEE is a hardware unit that implements the cryptographic functionality to secure pages when they are in memory. More specifically, the MEE can encrypt any cache line that gets evicted out of the processing device if it belongs to a secure page and the MEE also provides integrity protection and replay-protection for the secure pages. The MEE may reserve a range of platform memory statically at boot time and enforce the cryptographic protections on this range of memory. This secure memory range may is referred to as the Enclave Page Cache (EPC) and may include an integrity and replay-protection tree that the MEE uses to secure EPC pages. EPC pages may refer to secure pages that are encrypted and integrity protected by the MEE. Enclave memory requests are satisfied from the EPC.

Conversion instructions may be executed to convert convertible pages to EPC (e.g., also referred to as "secure") and back to non-EPC. It should be understood that "secure" and "EPC" are used interchangeably herein. The conversion instructions may include a page conversion instruction (referred to as an EMKEPC instruction herein) to convert a non-secure convertible page to an EPC page, and a page allocation instruction (referred to as an EPCALLOC instruction herein) to allocate the converted EPC page in memory for SE use. When the EPC page is converted using the EMKEPC instruction, the EPC page may be an invalid EPC page that has not yet been allocated to a SE. The invalid EPC page may not be accessible to applications and/or hardware components until allocation occurs. Once the EPCALLOC instruction executes, the EPC page may become allocated to a SE as a valid EPC page and available for use by an application (e.g., an application may start making changes to the EPC page) and/or hardware component. When a SE is finished with an EPC page, an SE instruction (e.g., EREMOVE) may be executed to invalidate the valid EPC page and then another conversion instruction (e.g., EMKNONEPC) may be executed to convert the invalid EPC page to a non-secure page. It should be understood that any page may be converted to secure and back to non-secure dynamically numerous times over a period of time based on instructions from the operating system.

In some instances, when an application (e.g., OS, VMM, other applications, etc.) makes a non-secure access (e.g., read/write) request to a page, there may be access control checks that are performed to determine whether the page is secure, and if so, restrict access to the secure page. If the page is determined to be non-secure, the non-secure access may be allowed. For example, an Enclave Page Cache Map (EPCM) section associated with the page may include metadata for the page and may be accessed and read to determine whether the requested page is secure or non-secure. The metadata that is read may include the SE to which the page belongs, the address of the page, the state (e.g., secure or non-secure), and so forth. Maintaining the state of the page in the EPCM may hinder performance as the EPCM may be accessed for each request just to determine whether the page is secure or non-secure. Retrieving EPCM data from memory may pollute a cache because the EPCM data is not application data. It may be desirable to just check the state data instead of retrieving the full EPCM data set.

In another instance, an application (e.g., OS, VMM, other applications, etc.) may corrupt an EPC page when the EREMOVE instruction is executed followed by the EMKNONEPC instruction. These instructions cause an EPC page to be invalidated and then converted to non-secure, respectively. Once the page is non-secure, the MEE that monitors integrity of EPC pages may ignore further integrity checks. Thus, the application may request a non-secure write to the newly non-secure page and the non-secure write may be executed to modify the non-secure page.

Negative consequences may result if a hardware component (e.g., prefetcher) begins prefetching the EPC page and the EPC page is converted to non-secure before prefetching completes. For example, when an on-demand access occurs and the processing device determines that a secure access is being made to a secure page, the prefetcher may anticipate what the next access may be and begin prefetching data from memory to improve performance. The prefetcher may begin prefetching the EPC page while it is secure and then the prefetcher may become stuck (e.g., due to power restrictions or some other restrictions). At the same time, the OS may execute the EREMOVE and EMKNONEPC instructions to invalidate the EPC page and to convert the EPC page to non-secure. The non-secure page may be written to by an application through a non-secure access write. The access by the application to the non-secure page is legitimate and the MEE is bypassed because the page was converted to non-secure. However, the prefetcher may continue prefetching and issue secure access requests to prefetch the now modified non-secure page. The MEE may attempt to decrypt the block of memory associated with the non-secure page and detect that the block is corrupted. In some instances, the MEE may perform an undesirable action (e.g., shutdown the system) as a result.

Accordingly, embodiments of the disclosure improve the performance of access control and the robustness of system stability. In one embodiment, one or more secure state bit arrays may be provided in memory to improve the lookup speed of finding the state of the pages during non-secure access requests. For example, a lowest level secure state bit array may include secure state bits associated with the pages and the secure state bits may indicate whether each respective page is secure or non-secure. A page miss handler (PMH) of the processing device may receive an access request to a page and retrieve a single secure state bit of data from the lowest level secure state bit array to determine whether the page is secure or non-secure. The lowest level secure state bit array may include one bit per page. If the page is non-secure, the page may be added to a translation lookaside buffer (TLB). If the page is secure, an abort page address may be added to the TLB. The abort page address may cause the memory controller to treat accesses to the abort page address with abort behavior described herein. By just accessing a single bit, performance may be improved because the full data set of EPCM data is not retrieved. Further, the cache may not be polluted with irrelevant data.

Performance may be further improved by using additional secure state bit arrays arranged in a hierarchical structure. For example, a mid-level secure state bit array may include secure state bits that indicate whether a particular range of memory addresses (e.g., 2 megabyte (MB)) include at least one secure page. These secure state bits may be set based at least on the secure state bits in the lowest level secure state bit array associated with the pages. If a secure state bit indicates that there is a secure page in the particular range, the PMH may drill-down to the lowest level secure state bit array to determine whether the secure state bit associated with the actual page indicates that the page is secure or non-secure. A highest-level secure state bit array may include secure state bits that indicate whether a higher up range of memory addresses (e.g., 1 gigabyte (GB)) includes at least one range of memory addresses having a secure page. These secure state bits may be set based at least on the secure state bits in the mid-level secure state bit array. If the PMH identifies a range in which a requested paged is located and determines that the range is associated with a secure state bit in the highest-level secure state bit array indicating that there is a secure page in that range, the PMH may drill-down to inspect the secure state bits of the mid-level secure state bit array. If the PMH determines that the mid-level range including the page is associated with a secure state bit indicating there is at least one secure page in that mid-level range, then the PMH may drill-down to the lowest level secure state bit array to determine whether the secure state bit associated with the requested page indicates the page is secure or non-secure.

However, if the PMH identifies a range in which a requested page is located and determines that the range is associated with a secure state bit in the highest-level secure state bit array or the mid-level secure state bit array indicating that there are just non-secure pages in that range, the PMH may determine that the requested page is non-secure and add the page to the translation lookaside buffer (TLB) without drilling down to the lowest level secure state bit array. Although three levels are discussed herein, it should be understood that any suitable number of levels in the secure state bit array hierarchy may be used. To enhance performance even further, the secure state bits may be cached on the processing device when determining whether the pages are secure or non-secure.

In another embodiment, robustness of system stability may be enhanced by using the EMKNONEPC instruction to reset counters used by the MEE. The EMKNONEPC instruction may change the secure state bit to a value indicative of non-secure in the secure state bit array associated with the requested page. Once the page is converted to non-secure, non-secure writes may be allowed. However, the EMKNONEPC instruction may also issue operation codes (e.g., microarchitecture 0-size writes) that cause the MEE to set counters to an initialization value. After the counters are set to the initialization value, the first secure access (e.g., via the prefetcher in the above example) may cause the MEE to return a fixed pattern of data (e.g., all zeroes). The MEE may not retrieve any memory for the page because the page includes corrupted ciphertext due to the non-secure write. As such, the non-secure page may continue to be modified by non-secure writes and the prefetcher may continue to prefetch the fixed pattern of data without causing the MEE to perform the undesirable behavior.

FIG. 1 is a block diagram illustrating a computing system 100 for implementing secure memory according to one embodiment. A processing device 110 may include one or more processor cores 120, one or more system agents 130 (e.g., a memory encryption engine 132, a page miss handler 134, an input/output memory management unit (IOMMU) 136), a memory controller 140 including a translation lookaside buffer 142, a cache 160, one or more hardware prefetchers 160 associated with the cache 160, and so forth. Each of the components in the processing device 110 may be communicatively coupled to one another or just a portion of the other components. For example, the processor core 120 may be communicatively coupled to the cache 150 and the system agent 130. Further, the processing device 110 may be coupled to a memory device 170 that includes a protected region 172.

The secure memory ranges (also referred to as the convertible ranges) may be included in the protected region 172 and may be set up at boot time by a basic input-output system (BIOS). The processing device 110 may execute instructions to convert pages in these convertible ranges as guided by software executing on the processing device 110, such as an operating system (OS) or a virtual machine monitor (VMM), as described herein. Also, the memory protections afforded by the MEE 132 may be transparent in the sense that the processing device 110 does not execute any instructions for providing confidentiality, integrity and replay protections. For example, when any cache line belonging to a secure page is evicted, the MEE 132 may automatically provide these protections to that cache line. The processing device 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 110 may be used in a system on a chip (SoC) system.

The computing system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

The one or more processor cores 120 may execute instructions of the system. The processor core 120 includes, but is not limited to, pre-fetch logic to fetch instructions, decode logic to decode the instructions, execution logic to execute instructions and the like. The processing device 110 includes the cache 150 to cache instructions and/or data. The cache 150 includes, but is not limited to, level one, level two, and a last level cache (LLC) 152, or any other configuration of the cache memory within the processing device 110. In another embodiment, the computing system 100 includes a component, such as a processing device 110 to employ execution units including logic to perform algorithms for processing data, in accordance with the embodiment described herein.

The prefetcher 160 may determine instructions and/or data to prefetch from the memory device 170 in an attempt to improve performance and reduce latency. The prefetcher 160 may prefetch the instructions and/or data based on previously executed instructions and/or previously used data. The hardware prefetcher 160 may operate transparently to fetch streams of data and instructions from the memory device 170 into the cache 150. The prefetcher 160 may handle multiple streams in either the forward or backward direction and the prefetching may occur up to a page boundary.

The memory controller 140 performs functions that enable the processing device 110 to access and communicate with the memory device 170 that includes a main memory 171 (e.g., a volatile memory and/or a non-volatile memory). In one embodiment, the memory controller 140 is coupled to the system agent 130 that includes the MEE 132, PMH134, and the IOMMU 136. In one embodiment, the MEE 132 is located between the last level cache 152 and the memory controller 140 to perform encryption, decryption and authentication of the data lines moving in and out of the protected region 172 of the memory device 170. The MEE 132 is located on the processor die, while the memory device 170 is located off the processor die.

In an embodiment, the MEE 132 may be coupled to the memory controller 140. Memory accesses may be routed to the memory controller 140 using physical addresses. The MEE 132 may process accesses that have a Guarded Attribute (GA) set to 1. The GA is an attribute added to each cache line (L1, L2, LLC) and memory transaction. GA indicates that the cache line belongs to an enclave (secure data). The MEE 132 may observe each access routed to the memory controller 140 to which it is coupled, but the MEE 132 may react to secure accesses (e.g., GA set to 1).

In one embodiment, the MEE 132 processes multiple memory read requests in parallel to improve the access latency to the protected region 172. The MEE 132 performs counter-mode encryption which requires the encryption seed to be unique for a data line both temporally and spatially. Spatial uniqueness can be achieved by using the address of the data line to be accessed, while temporal uniqueness can be achieved by using a counter that serves as the version of the data line. In one embodiment, the MEE 132 also protects the data lines in the protected region 172 of the memory device 170 using an integrity and replay-protection tree, which is a data structure referred to as the MEE tree 133. The versions of the data lines are part of this MEE tree 133. The MEE tree 133 may be used to check the integrity of the secure pages. The MEE tree 133 may include counters used for counter-mode encryption and decryption and may include Message Authentication Codes (MACs) associated with the secure cache lines. The MACs may be computed by the MEE 132 for secure writes and the MACs may be checked on secure reads. These counters and MACs may be maintained in the MEE tree 133 by the MEE 132 for each 64-byte memory block.

The EMKNONEPC instruction may include logic that causes the MEE 132 to reset counters for a given page to prevent the MEE 132 from shutting down the system when a secure access (e.g., by the prefetcher 160) is made to a recently converted non-secure page. The counters may be reset to an initialization value that causes the MEE 132 not to fetch data from memory and check its integrity (e.g., compute its MACs), but instead to return a fixed pattern of data (e.g., all 0s). Thus, when a secure page is populated with enclave contents, request for ownership (RFOs) return the fixed pattern of data. The first secure writes to each 64-byte block increments the counters and computes and stores the MACs in the MEE tree 133. This process of incrementing counters for the first time may be referred to as "arming". When the counters are armed, the MEE 132 computes the MACs on reads and compares them to the MACs stored in the MEE tree 133 to verify that the MACs match and the integrity of a given 64-byte block is maintained.

Since every page can be converted to secure and then back to non-secure, the counters have to be reset before a page is reused for enclave use because the MEE 132 considers any contents placed in memory while the page was non-secure to be corrupted cipher text and may perform an undesirable behavior (e.g., shutdown system). When the MEE 132 sees the counters set to the initialization value, the MEE 132 may not compute MACs, but instead return the fixed pattern of data to maintain system stability. Thus, the EMKNONEPC instruction may prevent a stuck prefetcher 160 from causing the MEE 132 to shutdown the system as long as the operating system does not allow non-secure writes until after the EMKNONEPC instruction executes. The operating system uses the secure state bit in the one or more secure state bit arrays to prevent non-secure writes to secure pages. The secure state bit is set to a value indicative of non-secure when the EMKNONEPC instruction executes. Thus, the operating system allows non-secure writes after the EMKNONEPC instruction executes and sets the secure state bit to non-secure.

As disclosed herein, other system agents 130 include the PMH 134 and the IOMMU 136. The PMH 134 and the IOMMU 136 may be used during a page walk, which refers to translating virtual addresses to physical addresses for pages that are requested to be accessed. Conventionally, during page walks, the PMH 134 and the IOMMU 136 perform access control checks by reading the secure state from the EPCM, which includes metadata for the page and takes more space in memory than a single bit of secure state information. As such, unnecessary data was brought to caches while doing the access control checks, which may cause cache contention. Further, reading the EPCM to find the state data may degrade performance.

According to one embodiment, one or more secure state bit arrays may be used to increase the performance of determining whether a requested page is secure or non-secure for non-secure access requests and to reduce cache contention. These one or more secure state bit arrays are separate data structures from the EPCM. A lowest level secure state bit array may include a secure state bit associated with a page (e.g., one secure state bit of information for each 4 kb physical page) and the secure state bit may indicate whether that page is secure or non-secure. Further, these secure state bits (e.g., associated with the pages) may be synchronized with the secure state bit for the page in the EPCM. For example, the EMKEPC instruction sets the secure state bit associated with the page in the lowest level secure state bit array and the secure state bit associated with the page in the EPCM (EPCM.E) to a value indicative of secure (1) and the EMKNONEPC instruction clears the secure state bit associated with the page in the lowest level secure state bit array and the secure state bit associated with the page in the EPCM to a value indicative of non-secure (0). By using a compact secure state bit array to hold the EPC state information data that is brought into processing device caches from memory ensures that the data is related to EPC state and caches are not cluttered with unnecessary metadata. Further, accessing the secure state bit array may be faster than accessing the EPCM.

Additional performance improvements may be gained by using a hierarchical structure to organize the one or more secure state bit arrays. In addition to the lowest level secure state bit array, there may be one or more higher level secure state bit arrays that cover large physical ranges. That is, while each 4 KB page has a secure state stored in the lowest level secure state bit array, one or more higher level secure state bit arrays may store bits related to the secure state of multiple 4 KB pages (e.g., a range of memory addresses). This may solve fracturing of large page mappings and may minimize the number of accesses for secure state bit checks.

In one embodiment, there may be two levels of secure state bit arrays on top of the lowest level secure state bit array. A first level may include a secure state bit array for a first range of memory addresses (e.g., 2 MB) and a second level may include a secure state bit array for a second range of memory addresses (e.g., 1 GB). 2 MB and 1 GB align with the large page mapping sizes that can be used by applications, but it should be noted that any sized address ranges may be used. Further, fewer or additional levels may be added to the hierarchy as desired (e.g., for systems with larger memory, more levels may be added to the hierarchy). These levels indicate that there is a secure page in that physical range and if the page walk ends up with a large mapping, the mapping may be fractured to a smaller size TLB entry such that corruption is prevented through a large page mapping. If there are no secure pages in that physical range, a large page mapping may be inserted into the TLB 142 properly. Further, if there are no secure pages in that range, as indicated by the secure state bit in the higher level secure state bit array, the lower level bit arrays may not be checked and thus accesses to the bit arrays may be minimized. Higher level secure state bit arrays may be referred to as Non-Enclave Fracture (NEF) bit. The NEF bit may be updated by the EMKEPC and the EMKNONEPC instructions, as well.

Yet additional performance improvements may be gained by caching the one or more bits inside the processing device 110. That is, dedicated caches 135 and 137 inside of the page walking agents, the PMH 134 and the IOMMU 136, may be used to cache the secure state bits associated with the requested pages. During the page walk, the PMH 134 and/or the IOMMU 136 may first check the dedicated caches 135 and 137 to determine whether the secure state bits are cached. If not found, an access will be sent to memory. The dedicated caches 135 and 137 may be addressed by physical address and they are accessed after the page translation from virtual address to physical address completes with a physical address. The higher level secure state bits may be cached, along with the secure state bit associated with the actual page, in the caches 135 and 137. Accesses may access the caches 135 and 137 and complete the secure state check for access control in less than a cycle.

For the following description, the following terminology is used for the memory device 170: The main memory 171 is divided into regions, including one or more protected regions 172 (also referred to herein as secure memory range or MEE region). Each region has multiple sections, an EPC section, which is convertible at page granularity, a hardware reserved section of replay-protection and integrity metadata, which is convertible at section granularity, and another hardware reserved section which is internal to implementation and is not available for conversion. In one embodiment, the protected region (MEE region) may be a fixed range or multiple protected regions (MEE regions) may be a set of multiple fixed ranges. In another embodiment, the entire memory could be configured as flexible memory, divided into multiple MEE regions. At startup, the entire memory starts as non-secure and the system software converts it as guided by the demand for secure memory on the system. As described herein, the main memory 171 may include multiple secure memory ranges (referred to herein as MEE regions), and may also include non-secure memory ranges.

Embodiments are not limited to computer systems. Alternative embodiments of the present invention can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

One embodiment may be described in the context of a single processor desktop or server system, but alternative embodiments may be included in a multiprocessor system. System 100 may be an example of a 'hub' system architecture. The computer system 100 includes a processing device 110 to process data signals. The processing device 110, as one illustrative example, includes a complex instruction set computer (CISC) microprocessor, a reduced instruction set computing (RISC) microprocessor, a very long instruction word (VLIW) microprocessor, a processing device implementing a combination of instruction sets, or any other processor device, such as a digital signal processor, for example. The processing device 110 is coupled to a processor bus that transmits data signals between the processing device 110 and other components in the system 100, such as memory device 170 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processing device 110 includes the internal cache 150. Depending on the architecture, the processing device 110 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processing device 110, in one embodiment, includes a microcode (ucode) ROM to store microcode, which when executed, is to perform algorithms for certain macroinstructions or handle complex scenarios. Here, microcode is potentially updateable to handle logic bugs/fixes for processing device 110.

Alternate embodiments of an execution unit may also be used in micro controllers, embedded processors, graphics devices, DSPs, and other types of logic circuits. System 100 includes the memory device 170. Memory device 170 includes a dynamic random access memory (DRAM)

device, a static random access memory (SRAM) device, flash memory device, or other memory device. Memory device 120 stores instructions and/or data represented by data signals that are to be executed by the processing device 110. The processing device 110 is coupled to the memory device 120 via a processor bus. A system logic chip, such as a memory controller hub (MCH) may be coupled to the processor bus and memory device 170. An MCH can provide a high bandwidth memory path to memory device 170 for instruction and data storage and for storage of graphics commands, data and textures. The MCH can be used to direct data signals between the processing device 110, memory device 170, and other components in the system 100 and to bridge the data signals between processor bus, memory device 170, and system I/O, for example. The MCH may be coupled to memory device 170 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory device 170, chipset, and processing device 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the instructions executed by the processor core 120 can be used with a system on a chip. One embodiment of a system on a chip comprises of a processing device and a memory device. The memory device for one such system is a flash memory. The flash memory can be located on the same die as the processing device and other system components. Additionally, other logic blocks such as a memory controller or graphics controller can also be located on a system on a chip.

Figure 2A:
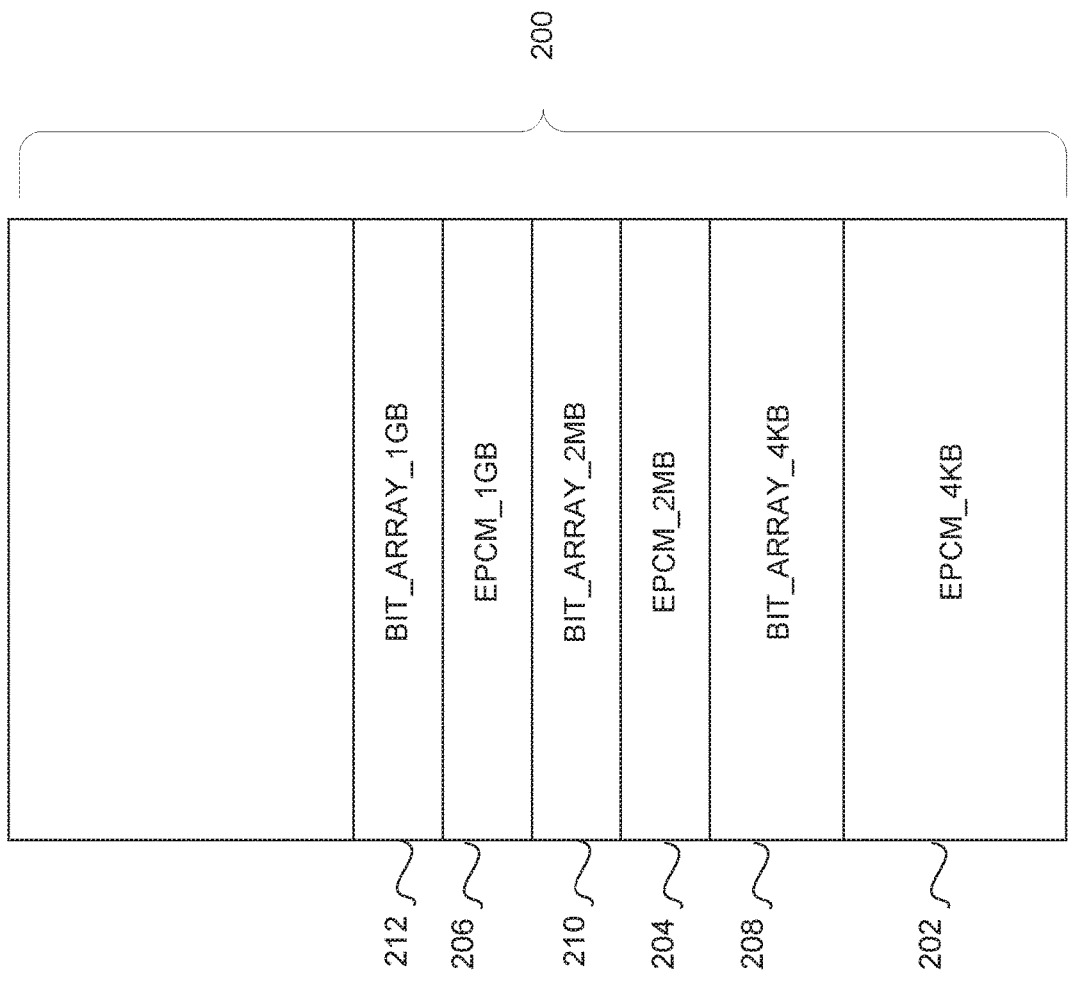
FIG. 2A illustrates a flexible Enclave Page Cache domain range register (FEDRR) including metadata sections and bit arrays according to one embodiment.

FIG. 2A illustrates a flexible EPC domain range register (FEDRR) 200 including metadata sections 202, 204, and 206 and secure state bit arrays 208, 210, and 212 according to one embodiment. The FEDRR 200 may be stored on the processing device 110. As depicted, the FEDRR 200 includes a hierarchical structure of the secure state bit arrays 208, 210, and 212. BIT_ARRAY_4 KB 208 may be the lowest level secure state bit array and may include a single secure state bit indicating secure or non-secure for each page having a particular size (e.g., 4 KB). BIT_ARRAY_2 MB 210 may be a mid-level secure state bit array in the hierarchy that is above the BIT_ARRAY_4 KB 208. The BIT_AR-RAY_2 MB 210 may include a secure state bit for a particular 2 MB range of physical memory addresses that indicates whether there is at least one secure page within that 2 MB range. When the secure state bit is set, there may be at least one 4 KB page that is secure within that 2 MB range associated with that secure state bit. When the secure state bit is not set, every 4 KB page within that 2 MB range may be non-secure. BIT_ARRAY_1 GB 212 may be a highest-level secure state bit array in the hierarchy that is above the BIT_ARRAY_2 MB 210. The BIT_ARRAY_1 GB may include a secure state bit for a particular 1 GB range of physical memory addresses that indicates whether there is at least one 2 MB range having a secure page within that 1 GB range. When the secure state bit is set, there may be at least one 2 MB range including a secure page within that 1 GB range associated with that secure state bit. When the secure state bit is not set, every 2 MB range within that 1 GB range may include non-secure pages.

The FEDRR 200 also includes the EPCMs 202, 204, and 206 storing metadata for the pages of the different sizes. For example, the FEDRR 200 includes EPCM_4 KB 202, EPCM_2 MB 204, and EPCM_1 GB 206. The EPCMs 202, 204, and 206 may include metadata such as the SE to which the secure page belongs, the address of the page, the secure state bit, and the like. The EMKEPC and EMKNONEPC instructions may synchronize the secure state bits in the EPCMs 202, 204, and 206 and the secure state bits in the secure state bit arrays 208, 210, and 212. For alignment purposes, the secure state bit arrays 208, 210, and 212 are placed in between the EPCMs 202, 204, and 206.

As disclosed herein, the hierarchical secure state bit arrays 208, 210, and 212 may be used by the page walking agents (the PMH 134 and the IOMMU 136) during the page walk. Each EPC state check may start from the highest level secure state bit array (e.g., BIT_ARRAY_1 GB) in the hierarchy independent of the mapping size. If the NEF bit at the highest level is clear (e.g., set to 0), there is no reason to proceed checking the lower level secure state bit arrays (e.g., BIT_ARRAY_2 MB and BIT_ARRAY_4 KB), since there are no secure pages in the range associated with the NEF bit. When the system 100 is not using any EPC pages, every high level secure state bit (e.g., NEF bits) may be clear and the number of accesses may be minimal without much cache contention.

Figure 2B:
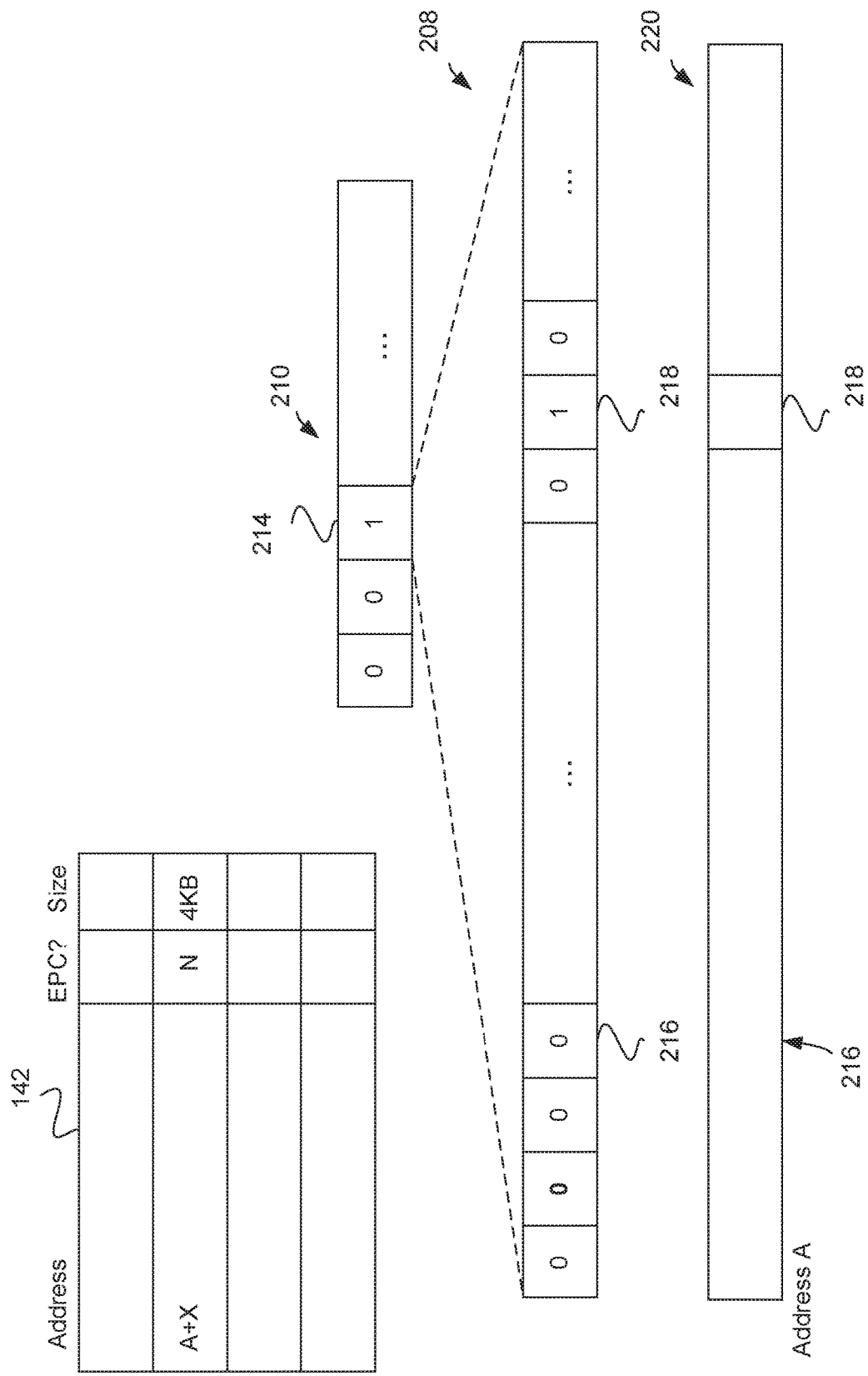
FIG. 2B illustrates hierarchically-structured secure state bit arrays according to one embodiment.

FIG. 2B illustrates hierarchically structure secure state bit arrays 208 and 210 according to one embodiment. As depicted, the hierarchy includes a lowest level secure state bit array (e.g., BIT_ARRAY_4 KB 208) and a higher level bit array (e.g., BIT_ARRAY_2 MB 210) on top of the lowest level secure state bit array. Although just two levels are shown in the hierarchy, it should be understood that any suitable number of levels may be implemented (e.g., 3, 4, 5, 6, etc.).

In an illustrative example, a non-secure write request to a non-secure page having address A+X may be received. The PMH 134 may begin performing a page walk and check whether the requested page is secure or non-secure. As such, the PMH 134 may access the BIT_ARRAY_2 MB 210 to check a secure state bit 214 associated with the 2 MB range in which the address of the requested page resides. The PMH 134 may determine that the secure state bit 214 in the BIT_ARRAY_2 MB 210 is set to a value (1) indicating that the range includes at least one secure page. Accordingly, the PMH 134 may drill-down to the next level (e.g., BIT_AR-RAY_4 KB 208) in the hierarchy.

The PMH 134 may determine that a secure state bit 216 associated with the requested page is set to a value (0) indicating that the page is non-secure. It should be noted that a secure state bit 218 for another page is set to a value (1) indicating that the other page is secure, thereby causing the state 214 for the 2 MB range of addresses to be set to 1 in the BIT_ARRAY_2 MB 210. As shown, the requested address A+X of the page resides in the 2 MB region of physical memory 220 with numerous other non-secure pages and just one secure page 218 (as indicated by the separation lines). Since the non-secure access request is for a page determined to be non-secure by the PMH 134, the PMH 134 may add the address of the non-secure page to the TLB 142. The TLB 142 may include at least the three fields depicted (e.g., address, EPC state, and size). Thus, the PMH 134 may insert the entry for the request page into the TLB 142 with the address of the page (A+X), the EPC state of the page (N or 0), and the size of the page (4 KB).

If the secure state bit in the BIT_ARRAY_4 KB 208 indicates that the requested page was secure, then the PMH 134 may insert an abort page address into the TLB 142. The abort page address may cause accesses to be treated with abort behavior (e.g., reads to return a fixed pattern of data (e.g., all 1s) and may cause writes to be dropped).

Figure 3A:
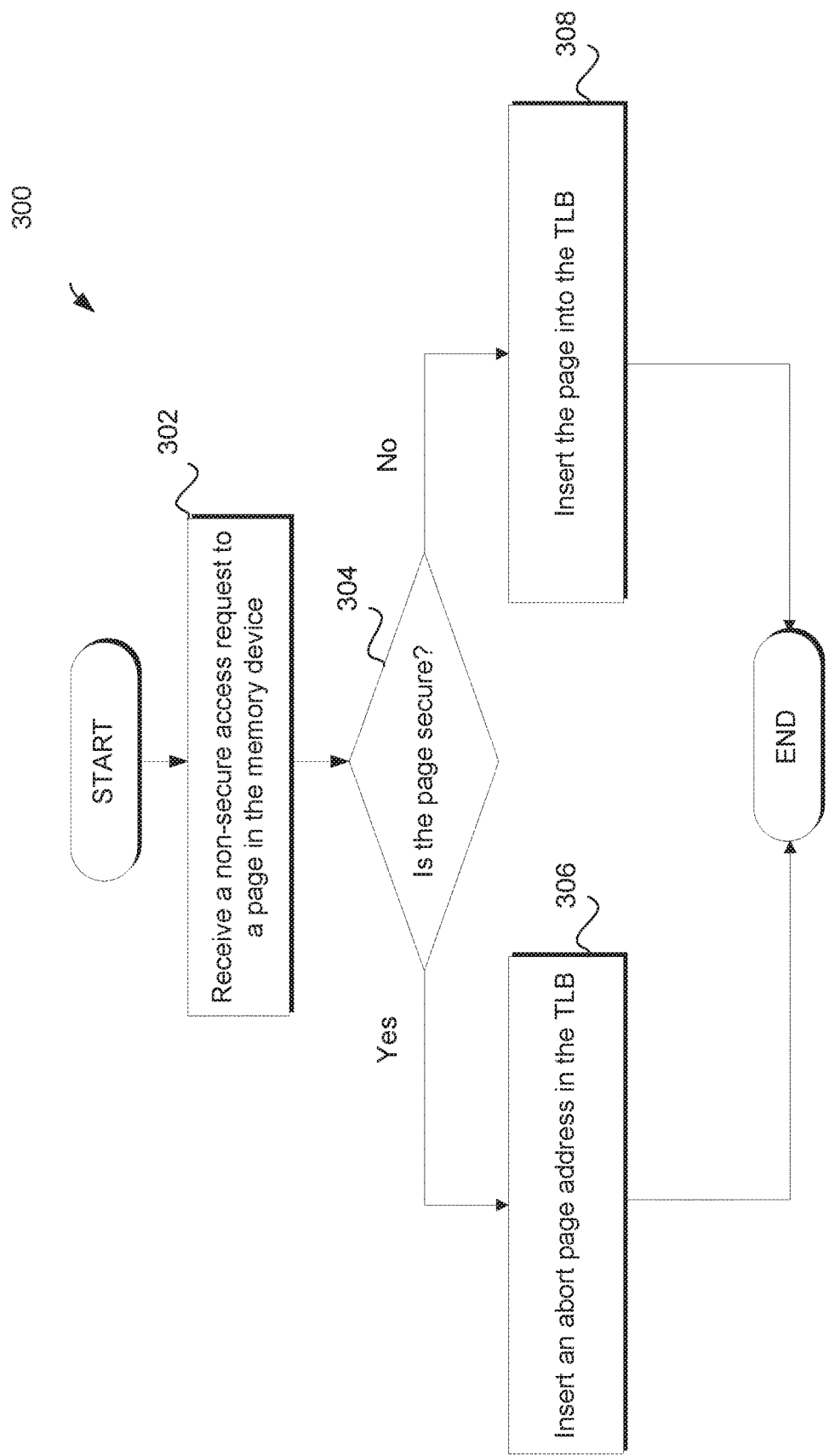
FIG. 3A is a flow diagram of an example method for improving the performance of controlling access to secure pages for non-secure access requests by an application according to one embodiment.

FIG. 3A is a flow diagram of an example method for improving the performance of controlling access to secure pages for non-secure access requests by an application according to one embodiment. Method 300 may be performed by processing logic that may comprise hardware (e.g., circuitry, dedicated logic, programmable logic, microcode, etc.), software (such as operations being performed by the MCU), firmware or a combination thereof. In one embodiment, method 300 is performed by one or more components of the processing device 110 of FIG. 1. In another embodiment, the method 300 is performed by any of the processing devices described with respect to FIGS. 7a-13. Alternatively, other components of the computing system 100 (or software executing on the processing device 110) may perform some or all of the operations of the method 300.

Referring to the method 300, at block 302 the processing logic may receive a non-secure access request to a page in the memory device 170. The non-secure access request may be received from an application (e.g., OS, VMM, other application executing on the processing device 110, etc.). The processing logic may determine (block 304) whether the page is secure or non-secure. In some embodiments, block 304 may be performed by the PMH 134. Responsive to a determination, based on one or more secure state bits in one or more secure state bit arrays, that the page is a secure page, the processing logic may insert (block 306) an abort page address into the TLB 142. In contrast, responsive to a determination, based on the one or more secure state bits in the one or more secure state bit arrays, that the page is a non-secure page, the processing logic may insert (block 308) the page into the TLB 142.

In one embodiment, the one or more bit arrays may include a single secure state bit array (e.g., BIT_ARRAY_4 KB 208) storing secure state bits associated with pages in the memory device 170. The secure state bit array is a separate structure than the EPCM and the secure state bit array includes a single secure state bit for each page. Each of the secure state bits may indicate whether a respective page is secure or non-secure. The processing logic may access the secure state bit array to find the secure state bit associated with the requested page and determine whether the page is secure or non-secure. In an embodiment, the PMH 134 may check dedicated caches 135 and 137 to determine if the desired secure state bit for the requested page is cached. Additional embodiments may include using a hierarchical structure of one or more secure state bit arrays for determining whether the page is secure or non-secure, as described with reference to FIGS. 3B and 3C below.

Additionally, in an embodiment, a secure application may make a secure access request to a secure page. In response, the prefetcher 160 may begin prefetching data for the secure page. The processing logic may execute an instruction (EMKNONEPC) to convert the secure page to a non-secure page. Responsive to receiving a non-secure write request from to the non-secure page from an application, the processing logic may write to the non-secure page to create a modified non-secure page. The MEE 132, responsive to receiving, from the prefetcher 160, a secure access request to the modified non-secure page, may return a fixed pattern of data to the prefetcher to prevent system shutdown, as discussed in more detail below.

Figure 3B:
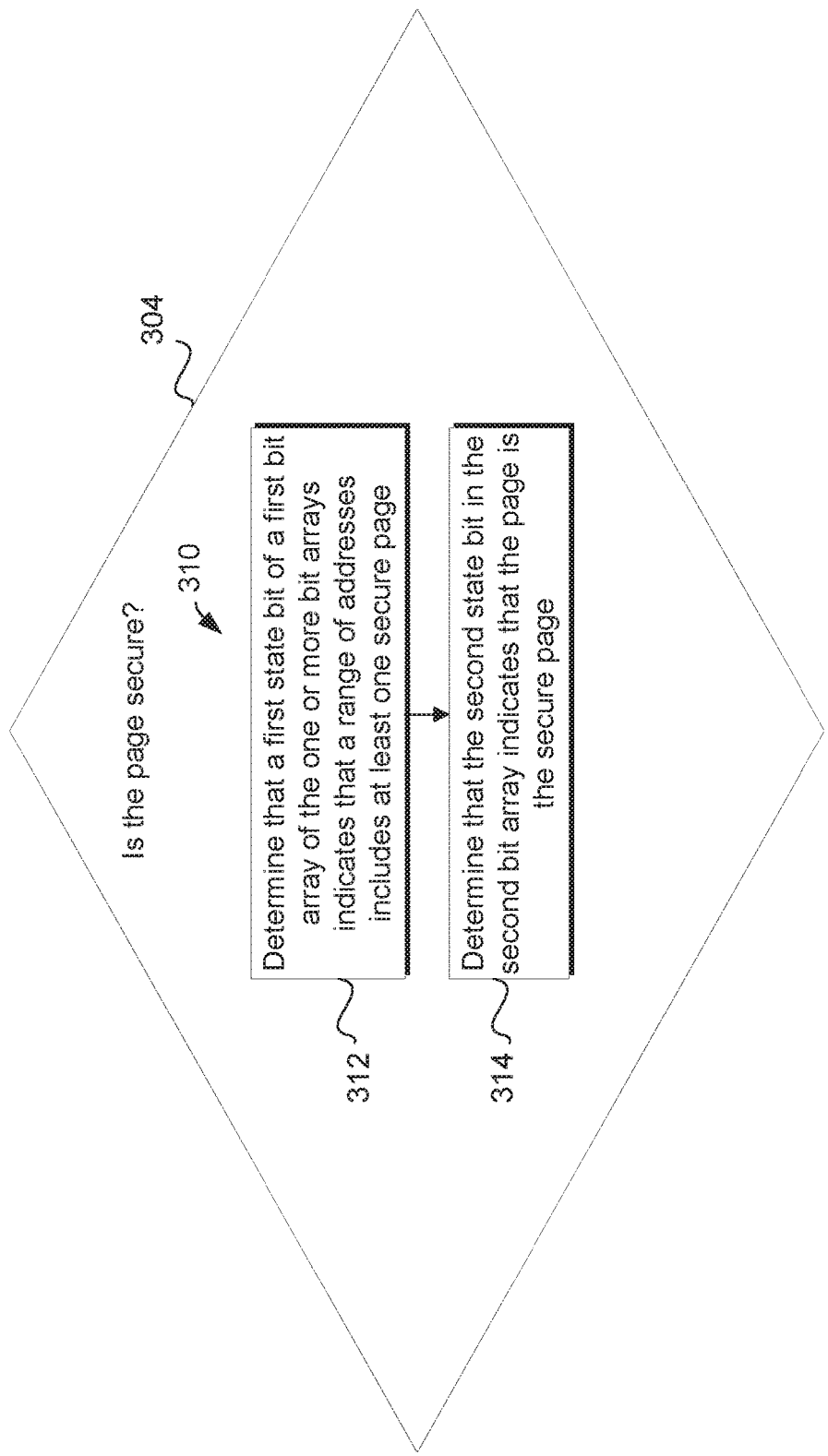
FIG. 3B is a flow diagram of an example method for using hierarchically-structured bit arrays with two levels to determine that a page is secure according to one embodiment.

FIG. 3B is a flow diagram of an example method 310 for using hierarchically structured secure state bit arrays (BIT_ARRAY_4 KB 208 and BIT_ARRAY_2 MB 210) with two levels to determine that a page is secure according to one embodiment. Method 310 may be performed as part of block 304 of method 300. Method 310 may be performed by processing logic that may comprise hardware (e.g., circuitry, dedicated logic, programmable logic, microcode, etc.), software (such as operations being performed by the MCU), firmware or a combination thereof. In one embodiment, method 310 is performed by one or more components of the processing device 110 of FIG. 1. In another embodiment, the method 310 is performed by any of the processing devices described with respect to FIGS. 7a-13. Alternatively, other components of the computing system 100 (or software executing on the processing device 110) may perform some or all of the operations of the method 310.

Referring to the method 310, at block 312 the processing logic may determine that a first secure state bit of a first secure state bit array (e.g., BIT_ARRAY_2 MB 210) indicates that a range of addresses (2 MB) includes at least one secure page. The range of addresses may include the address of the requested page. The first secure state bit may be set based at least on a second secure state bit of a second secure state bit array (e.g., BIT_ARRAY_4 KB 208). The second secure state bit array may include secure state bits associated with the actual pages in the memory device 170. If the first secure state bit indicates that the range of addresses including the address of the requested page includes just non-secure pages, then the processing logic may determine that the range includes non-secure pages and may insert the page into the TLB 142. If the first secure state bit indicates that the range of addresses including the address of the requested page includes at least one secure page, the processing logic may drill-down in the hierarchy of secure state bit arrays to determine (block 314) that the second secure state bit in the second bit array indicates that the page is a secure page. If the page is secure, then the processing logic may insert an abort page address into the TLB 142. If the page is non-secure, then the processing logic may insert the page into the TLB 142.

Figure 3C:
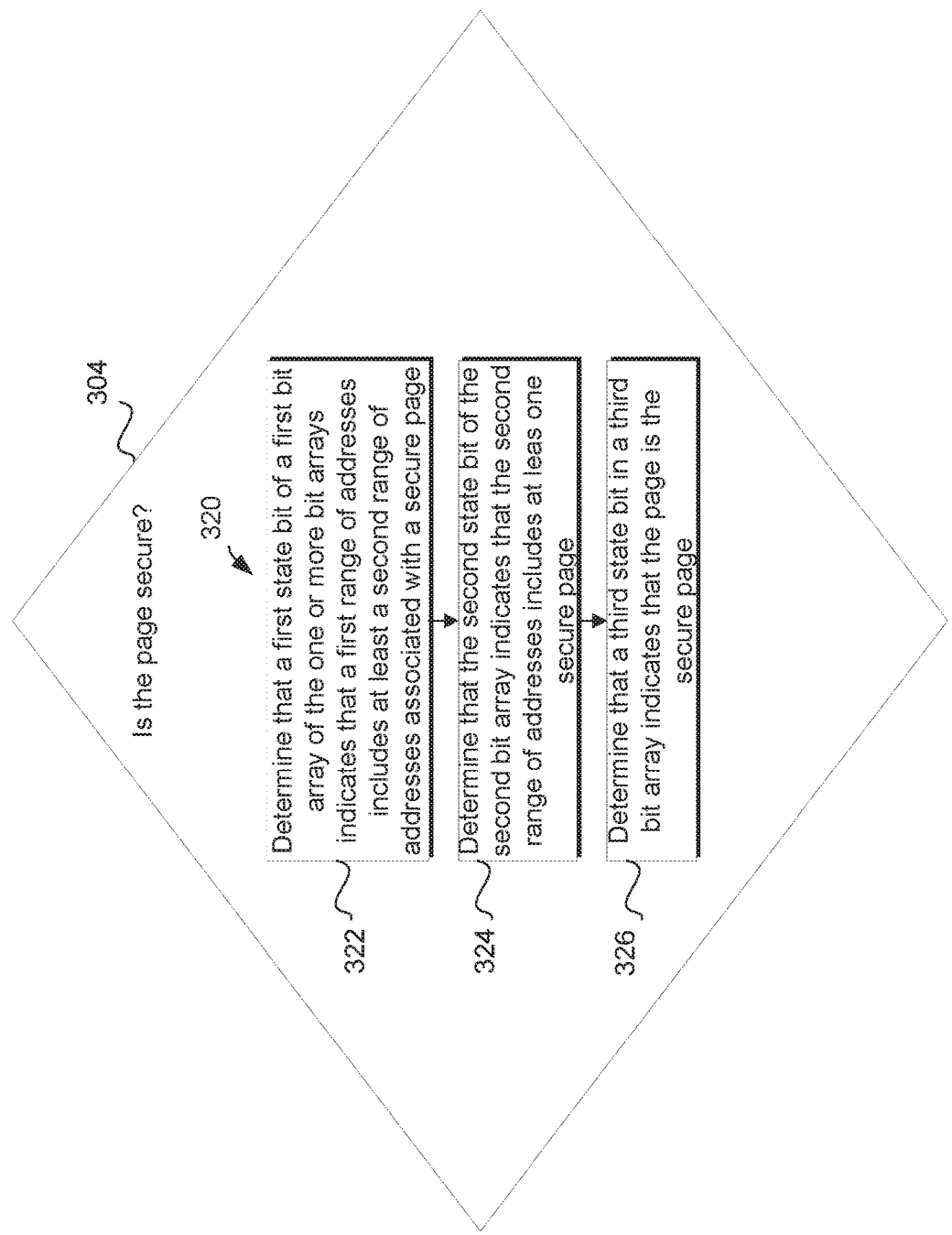
FIG. 3C is a flow diagram of an example method for using hierarchically-structured bit arrays with three levels to determine that a page is secure according to one embodiment.

FIG. 3C is a flow diagram of an example method 320 for using hierarchically structured bit arrays with three levels to determine that a page is secure according to one embodiment. Method 320 may be performed as part of block 304 of method 300. Method 320 may be performed by processing logic that may comprise hardware (e.g., circuitry, dedicated logic, programmable logic, microcode, etc.), software (such as operations being performed by the MCU), firmware or a combination thereof. In one embodiment, method 320 is performed by one or more components of the processing device 110 of FIG. 1. In another embodiment, the method 320 is performed by any of the processing devices described with respect to FIGS. 7a-13. Alternatively, other components of the computing system 100 (or software executing on the processing device 110) may perform some or all of the operations of the method 320.

In the method 320, a first secure state bit array (e.g., BIT_ARRAY_1 GB 212) may refer to the highest level secure state bit array in a hierarchy, a second secure state bit array (e.g., BIT_ARRAY_2 MB 210) may refer to the mid-level secure state bit array in the hierarchy, and a third secure state bit array (e.g., BIT_ARRAY_4 GB 208) may refer to the lowest level secure state bit array in the hierarchy. Referring to the method 320, at block 322 the processing logic may determine that a first secure state bit of a first secure state bit array (e.g., BIT_ARRAY_1 GB 212) indicates that a range of addresses (1 GB) includes at least a second range of addresses (2 MB) associated with a secure page. The first secure state bit may be set based at least on a second secure state bit of a second secure state bit array (e.g., BIT_ARRAY_2 MB 210). The second secure state bit may indicate that the second range of addresses includes the secure page.

At block 324, the processing logic may determine that the second secure state bit of the second secure state bit array (e.g., BIT_ARRAY_2 MB 210) indicates that the second range of addresses includes at least one secure page. The second range of addresses may include at least an address associated with the page. The second secure state bit may be set based at least on a third secure state bit of a third secure state bit array (e.g., BIT_ARRAY_4K 208). The third secure state bit is associated with the page and indicates that the page is secure or non-secure.

At block 326, the processing logic may determine that the third secure state bit in the third secure state bit array (e.g., BIT_ARRAY_4K 208) indicates that the page is the secure page. If the page is secure, the processing logic may insert an abort page address into the TLB 142. In another embodiment, if the secure state bit indicates that the page is non-secure, the processing logic may insert the page into the TLB 142.

In another embodiment, if the secure state bits (NEF bits) in the first secure state bit array (e.g., BIT_ARRAY_1 GB 212) or the second secure state bit array (e.g., BIT_ARRAY_2 MB 210) indicate that the ranges include just non-secure pages, the processing logic may stop searching the bit arrays and may insert the page into the TLB 142. That is, the processing logic may drill-down to lower levels in the hierarchy when the higher level bit (NEF bit) indicates that an address range including the address of the requested page includes at least one secure page. Accordingly, using the hierarchy of secure state bit arrays may improve performance for performing access control checks by reducing accesses and enhancing speed of determining whether the secure state bits indicate the requested page is secure or non-secure.

Figure 4:
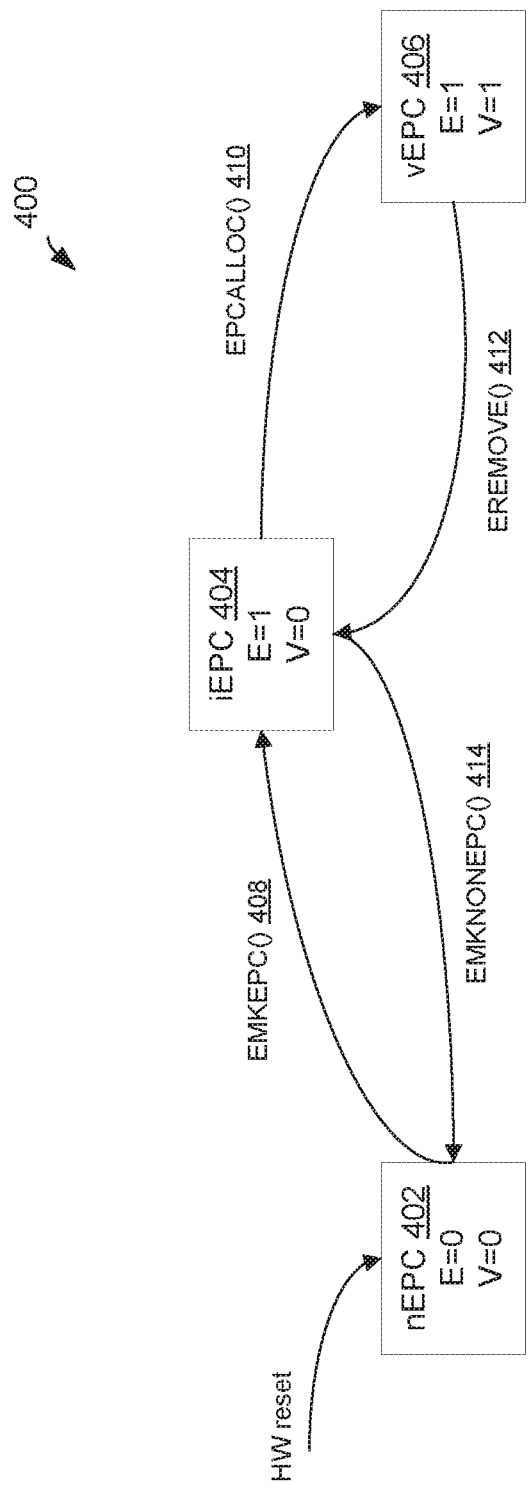
FIG. 4 is a state transition diagram for a page converted to secure and non-secure according to one embodiment.

FIG. 4 is a state transition diagram 400 for a page converted to secure and non-secure according to one embodiment. A page may be in one of three states at any given point in time. The three states include a non-secure state 402, an invalid secure state 404, and a secure state 406. Which state the page is in is dependent upon two different bits, a secure state bit (E) and a valid state bit (V), for the non-secure state 402, the E bit and the V bit are set to 0, for the invalid secure state 404, the E bit is set to 1 and the V bit is set to 0, and for the secure state 406, the E bit and the V bit are set to 1.

After a hardware reset, a page may be in the non-secure state (nEPC) 402 with the E bit set to 0 and the valid bit set to 0. Further, a hardware reset places the counters in the MEE tree 133 to 0. When the page is in the non-secure state (nEPC) 402, non-secure accesses to the page may be allowed. The EMKEPC instruction 408 may be executed to convert the page to an invalid secure page (iEPC) 404 where the E bit is 1 and the V bit is 0. EMKEPC 408 may set the secure state bit in the secure state bit array associated with the page (e.g., BIT_ARRAY_4K 208) and may update any higher level secure state bit arrays (BIT_ARRAY_1 GB 212 and/or BIT_ARRAY_2 MB 210), accordingly. In some embodiments, since the secure state bit is now set, non-secure writes by applications to the invalid secure page 404 may be blocked.

In another embodiment, the invalid secure page 404 may be accessed (e.g., via hardware) with non-secure writes but those writes may not be considered corruption by the MEE 132. Since the counters in the MEE tree 133 are in the initialization value for the page, the MEE 132 ignores the contents in memory for the page. When the EPCALLOC instruction 410 is executed to allocate the secure page to an SE, the counters for the page are armed. At this point, the page is a secure page in the secure state (vEPC) 406 and both the E bit and the V bit are set to 1. At this state, non-secure writes are considered corruptions by the MEE 132. If there is a secure access to a corrupted 64-byte block, the MEE 132 may detect an integrity failure and initiate a system shutdown.

When the page is invalidated, for example, by executing the EREMOVE instruction 412, the page returns to the invalid secure state (iEPC) 404 and the E bit is set to 1 and the V bit is changed to 0. The MEE counters may still be armed, and non-secure access writes may still be considered corruptions by the MEE 132. As disclosed herein, executing the EMKNONEPC instruction 414 may reset the MEE counters to the initialization value and may convert the invalid secure page in the invalid secure page state 404 back to a non-secure page in the non-secure state 402 by clearing (e.g., setting to 0) the E bit. When the counters are set to the initialization value, non-secure accesses may not be considered corruption by the MEE 132. Further, when the MEE counters are at the initialization value, any prefetches by the prefetcher 160 may return a fixed pattern of data, even if the secure access occurred before the page was converted from secure to non-secure.

Additionally, the EMKNONEPC instruction 414 may also decrement a second counter. If the second counter reaches 0, an EMKEPC instruction 408 may clear the corresponding secure state bit in the BIT_ARRAY_2 MB. If this occurs, the EMKEPC instruction 408 may also decrement a third counter. If the third counter reaches 0, an EMKNONEPC instruction 414 may clear the corresponding secure state bit in BIT_ARRAY_1 GB.

Figure 5:
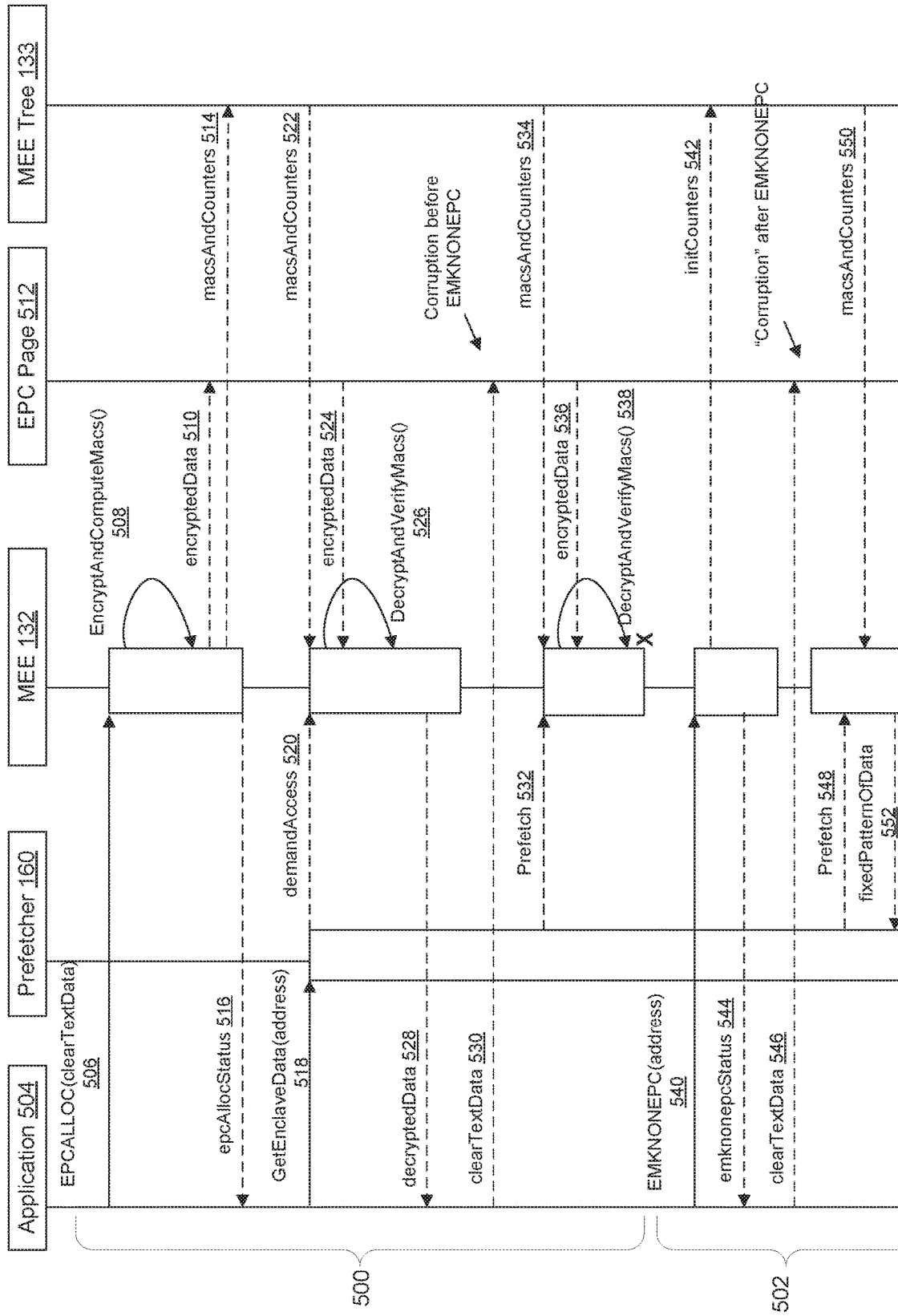
FIG. 5 is a sequence diagram of a non-secure conversion instruction that resets counters to cause a fixed pattern of data to be returned to a prefetcher requesting secure access to a non-secure page according to one embodiment.

FIG. 5 is a sequence diagram of a non-secure conversion instruction that resets counters to cause a fixed pattern of data to be returned to a prefetcher requesting secure access to a non-secure page according to one embodiment. This sequence diagram illustrates example 500 of how corrupted enclave data may cause the MEE 132 to detect integrity failure (Corruption before EMKNONEPC) and example 502 of how embodiments of the present disclosure use the EMKNONEPC instruction to prevent system shutdowns by instructing the MEE 132 to reset the counters.

Beginning with example 500, an application 504 (e.g., OS, VMM, etc.) may have created an invalid secure page by executing EMKEPC instruction. The EMKEPC instruction may set the secure state bit in the one or more secure state bit arrays and the EPCM. When the secure state bit is set to indicate the page is secure in the secure state bit arrays and EPCM, any non-secure access requests by applications may be blocked. The application 504 may execute an EPCALLOC instruction (506) to allocate a secure page to an SE. The instruction may cause the MEE 132 to encrypt and compute MACs (508) for the 64-byte block of data associated with the page. That is, since the MEE 132 implements counter-mode encryption, the MEE 132 may increment the counters and use the counters to encrypt the 64-byte block (510) of data for the EPC page 512. The MEE 132 may compute the MAC of that block to be stored in the MEE tree 133. The MEE 132 may transmit (514) the MACs and counters to the MEE tree 133. The MEE 132 may also transmit (516) a status (epcAllocStatus) of the secure page allocation.

Next, in the example 500, the application 504 may execute (518) a secure read that requests the prefetcher 160 to get secure data for an address associated with the secure page. The prefetcher 160 may demand (520) access to the address and may begin prefetching the data with additional secure accesses to the secure page. As a result, the MEE 132 may obtain (522) the MACs and counters for the requested page from the MEE tree 133. The MEE 132 may obtain (524) the encrypted data from the EPC page 512. The MEE 132 may decrypt the 64-byte block and compute the MAC. The MEE 132 will compare the newly computed MAC to the previously computed MAC and determine whether they match and the integrity of the page has been maintained. Upon verification, the MEE 132 may then transmit (528) the decrypted data to the application 504.

The EPC page 512 may be converted to a non-secure page and the application 504 may then perform (530) a non-secure write to the EPC page 512 (e.g., by clearing the text data). The non-secure write may be cleartext data written to the EPC page 512 by the application 504 that corrupts the EPC page 512. However, the prefetcher 160 may continue prefetching (532) with secure accesses to the newly converted non-secure page through the MEE 132. As such, the MEE 132 may obtain (534) the MACs and counters associated with the page from the MEE tree 133. The MEE 132 may obtain (536) the encrypted data associated with the EPC page 512. Further, the MEE 132 may decrypt (538) 64-byte block and compute the MAC. The MEE 132 may compare the newly computed MAC to the previously computed MAC and detect that the EPC page 512 has been corrupted. In response, the MEE 132 may initiate a system shutdown.

As illustrated in example 502, such an issue may be prevented by using the EMKNONEPC instruction disclosed herein. In example 502, it should be understood that the EPC page has been allocated to an SE and the prefetcher 160 has begun prefetching data related to the EPC page 512 by issuing secure access requests. The application may then execute (540) the EMKNONEPC instruction with the address of the page to convert the secure page to a non-secure page. The EMKNONEPC instruction may cause the secure state bit in the one or more secure state bit arrays and the EPCM to be cleared. Further, the EMKNONEPC instruction of the present disclosure may cause the MEE 132 to set the counters (542) in the MEE tree 133 to the initialization values. The EMKNONEPC instruction resets the counters for every 64-byte block even if the same 4 KB page is managed by multiple MEEs on servers with complex memory configurations (e.g., interleaving). It enables this by issuing 64 0-size writes (microarchitecture operation codes) for each of 64-byte blocks of a secure page that are correctly routed to the MEE 132. The operation codes include an address. The MEE 132 may transmit (544) a status of the EMKNONEPC instruction to the application 504.

After the page is converted to a non-secure page, the application 504 may issue a non-secure write request (546) to the non-secure page, which bypasses the MEE 132 because it is a non-secure write request. The write request may modify the non-secure page. The access may be legitimate from an access control point of view because the page is no longer secure. The prefetcher 160 may continue prefetching (548) data through the MEE 132 by issuing secure access requests to the newly converted non-secure page. The MEE 132 may obtain (550) the MACs and counters associated with the page from the MEE tree 133 and determine that the counters are set to the initialization values. Instead of decrypting and computing a new MAC for the data, the initialization values may cause the MEE 132 to transmit (552) a fixed pattern of data to the prefetcher 160. As such, the prefetcher 160 may continue to prefetch data and the MEE 132 may not initiate a system shutdown because it did not compute a MAC and compare the MACs. Thus, robustness of the system 100 may be improved using the logic included in the EMKNONEPC instruction.

Figure 6A:
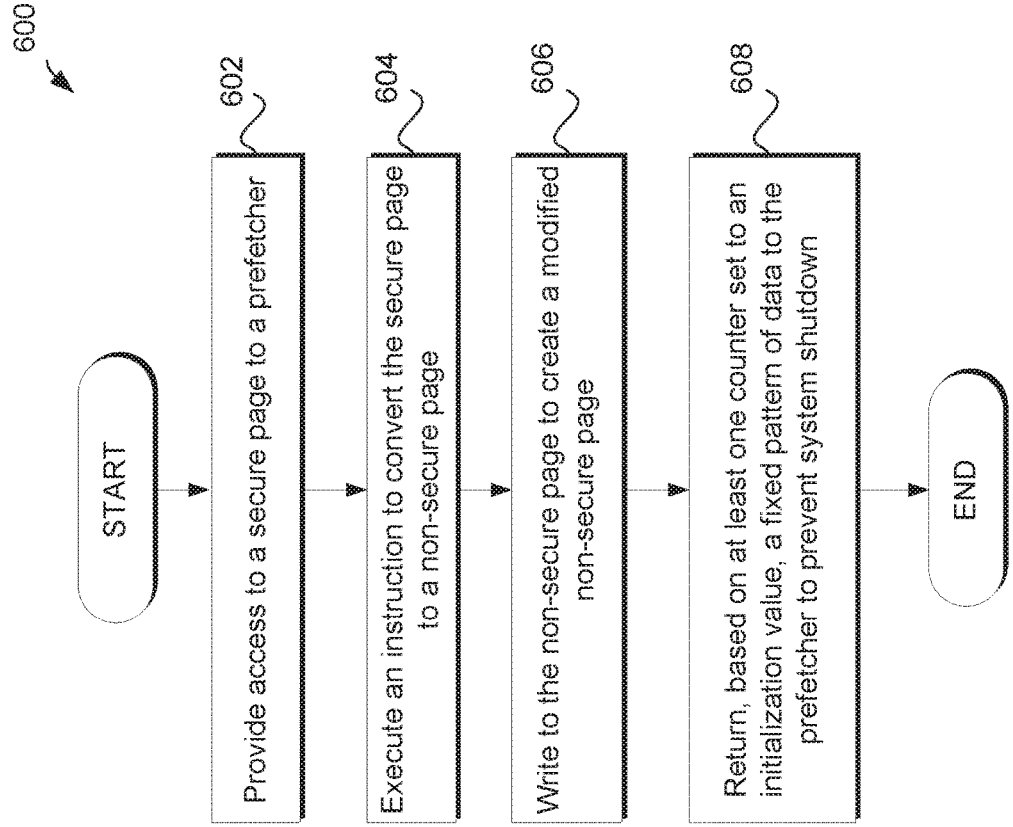
FIG. 6A is a flow diagram of an example method for protecting system stability when a secure access request by a hardware component is made to a non-secure page according to one embodiment.

FIG. 6A is a flow diagram of an example method 600 for protecting system stability when a secure access request by a hardware component (prefetcher 160) is made to a non-secure page according to one embodiment. Method 600 may be performed by processing logic that may comprise hardware (e.g., circuitry, dedicated logic, programmable logic, microcode, etc.), software (such as operations being performed by the MCU), firmware or a combination thereof. In one embodiment, method 600 is performed by one or more components of the processing device 110 of FIG. 1. In another embodiment, the method 600 is performed by any of the processing devices described with respect to FIGS. 7a-13. Alternatively, other components of the computing system 100 (or software executing on the processing device 110) may perform some or all of the operations of the method 600.

Referring to the method 600, at block 602, responsive to receiving, from the prefetcher 160, a first secure access request to a secure page, the processing logic may provide access to the secure page to the prefetcher 160. It should be understood that the secure page may have been allocated by the execution of the EPCALLOC instruction prior to the prefetcher 160 requesting access to the secure page. Further, the prefetcher 160 may request access to the secure page responsive to an application issuing a secure access request. According to some embodiments, the processing logic may determine that the page is secure based on a secure state bit in one or more secure state bit arrays. The processing logic may access the secure state bit in the dedicated cache 135 and 137.

At block 604, the processing logic may execute a conversion instruction (EMKNONEPC) to convert the secure page to a non-secure page. The EMKNONEPC instruction may clear (e.g., set to 0) the secure state bits in the one or more secure state bit arrays and the EPCM. Also, the EMKNONEPC instruction may cause the counters to be set to initialization values, among other things described below with reference to FIG. 6B.

At block 606, the processing logic may, responsive to receiving a non-secure write request to the non-secure page from an application, write to the non-secure page to create a modified non-secure page in memory. As previously noted, from an access control point of view the non-secure access to the newly converted non-secure page is legitimate because the page is no longer secure.

At block 608, the processing logic may, responsive to receiving, from the prefetcher 160, a second secure access request to the modified non-secure page, return, based on at least one counter in the MEE tree 133 set to an initialization value (0), a fixed pattern of data (0s) to the prefetcher 160 to prevent system shutdown. The MEE 132 may not compute a new MAC for the data associated with the modified non-secure page because the counters are set to the initialization values.

Figure 6B:
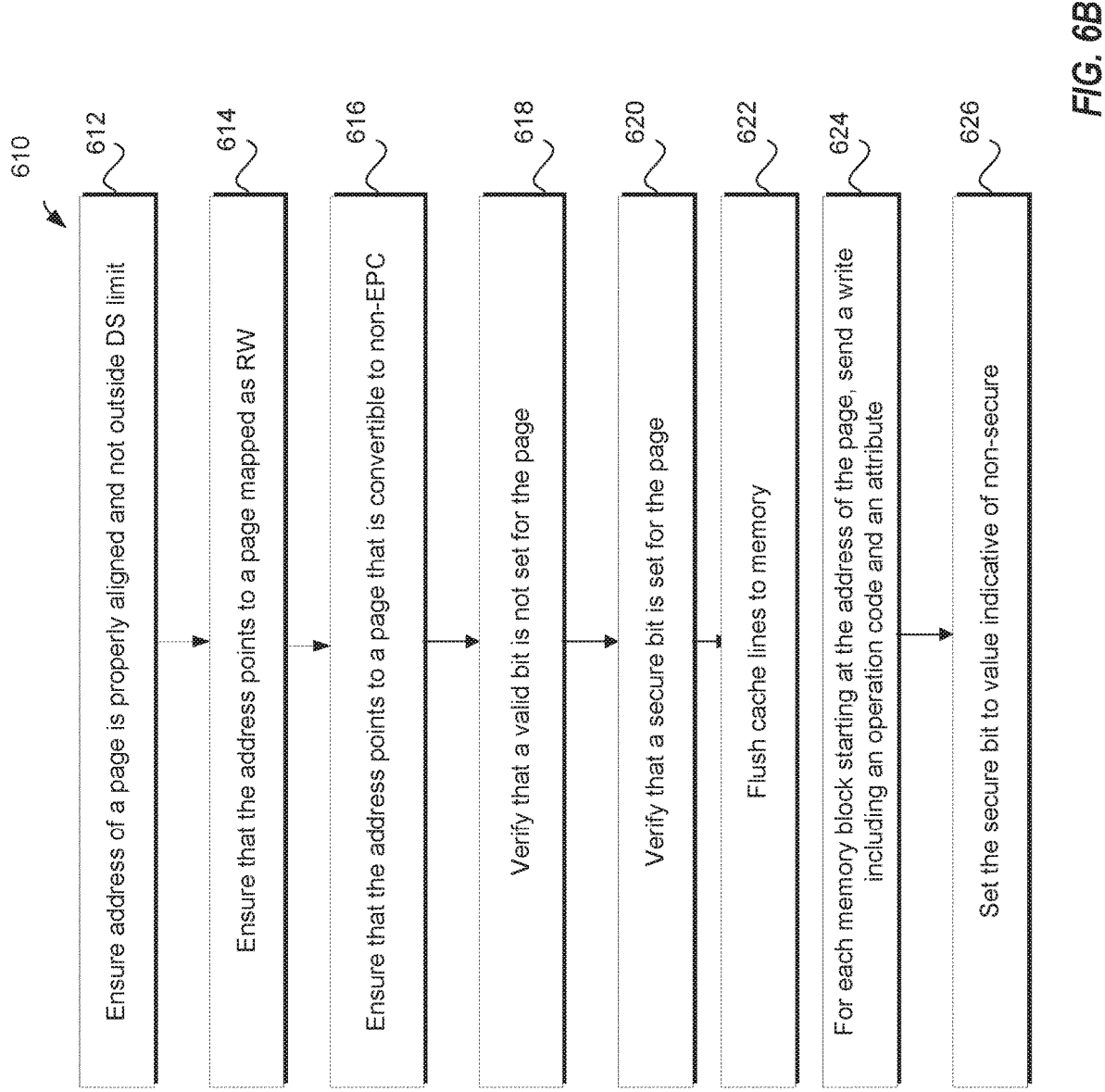
FIG. 6B is a flow diagram of an example method for executing a non-secure conversion instruction to enable protecting system stability according to one embodiment.

FIG. 6B is a flow diagram of an example method 610 for executing a non-secure conversion instruction (EMKNON- EPC) to enable protecting system stability according to one embodiment. Method 610 may be performed as part of block 610 in method 600. Method 610 may be performed by processing logic that may comprise hardware (e.g., circuitry, dedicated logic, programmable logic, microcode, etc.), software (such as operations being performed by the MCU), firmware or a combination thereof. In one embodiment, method 610 is performed by one or more components of the processing device 110 of FIG. 1. In another embodiment, the method 610 is performed by any of the processing devices described with respect to FIGS. 7a-13. Alternatively, other components of the computing system 100 (or software executing on the processing device 110) may perform some or all of the operations of the method 610.

Referring to the method 610, at block 612 the processing logic may ensure a page address received in the EMKNON-EPC instruction is properly aligned and not outside of data segment limit. At block 614, the processing logic may ensure that the address points to a page mapped as read/write (RW). At block 616, the processing logic may ensure that the address points to a page that is convertible to non-secure. At block 618, the processing logic may verify that a valid state bit (V) is not set for the page. At block 620, the processing logic may verify that a secure state bit (E) is set for the page by checking the secure state bit array associated with the page and/or the EPCM associated with the page.

Further, responsive to a determination that the secure page is an invalid secure page (e.g., V set to 0 and E set to 1), the processing logic may flush (block 622) one or more cache lines to memory. At block 624, for each 64-byte memory block starting at the address of the page (invalid secure page), the processing logic may send 0-size writes (microarchitecture operation codes) with a Guarded Attribute (GA) set to 1. A processor core 120 may assign the GA to each memory transaction and the GA may be checked to decide on a cache hit. The GA may cause the 0-size write to be routed to the MEE 132 to enable the MEE 132 to reset the counters to the initialization value. Further, at block 626, the processing logic sets the secure state bit (E) to 0 in the secure state bit array (e.g., BIT_ARRAY_4 KB 208) associated with the page and the EPCM associated with the page (e.g., EPCM_4 KB).

Figure 7A:
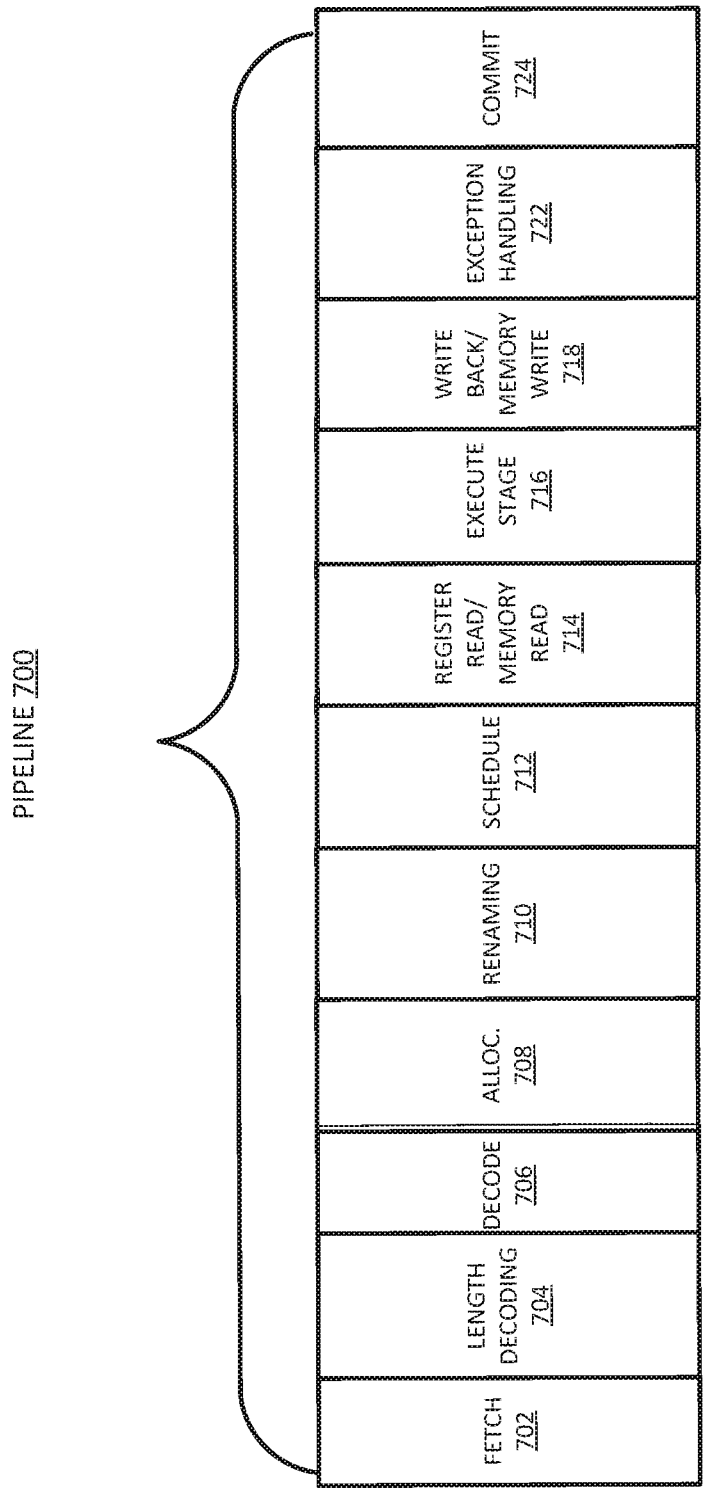
FIG. 7A is a block diagram illustrating a micro-architecture for a processor in which one implementation of the disclosure may be used.
Figure 7B:
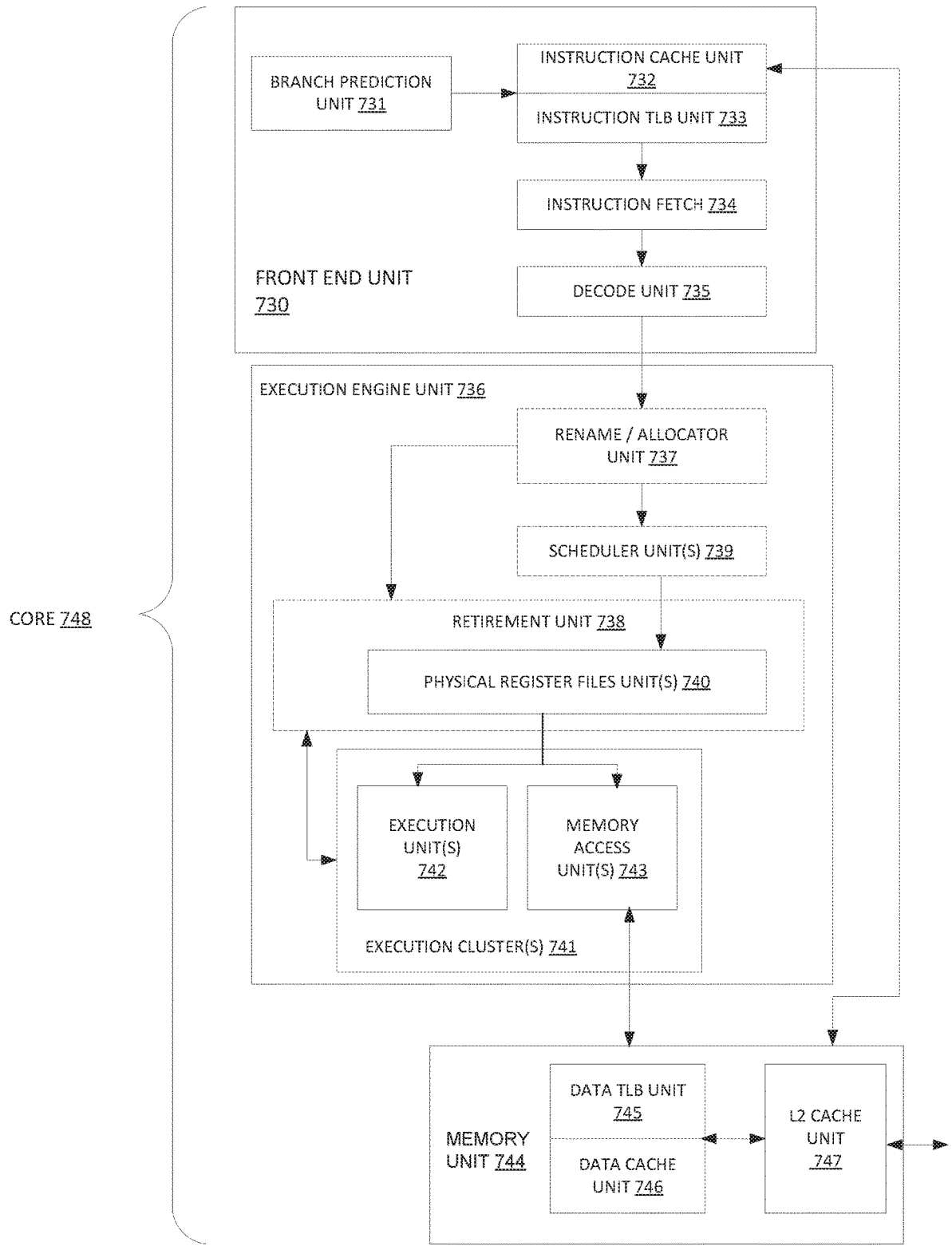
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register renaming stage, out-of-order issue/execution pipeline of a processor according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic.

In FIG. 7A, a processor pipeline 700 includes a fetch stage 702, a length decode stage 704, a decode stage 706, an allocation stage 708, a renaming stage 710, a scheduling (also known as a dispatch or issue) schedule stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 748 including a front end unit 730 coupled to an execution engine unit 736, and both are coupled to a memory unit 744.

The core 748 may be a reduced instruction set computing (RISC) core, a complex instruction set computing (CISC) core, a very long instruction word (VLIW) core, or a hybrid or alternative core type. As yet another option, the core 748 may be a special-purpose core, such as, for example, a network or communication core, compression engine, graphics core, or the like.

The front end unit 730 includes a branch prediction unit 731 coupled to an instruction cache unit 732, which is coupled to an instruction translation lookaside buffer (TLB) 733, which is coupled to an instruction fetch unit 734, which is coupled to a decode unit 735. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 732 is further coupled to a level 2 (L2) cache unit 747 in the memory unit 744. The decode unit 735 is coupled to a rename/allocator unit 737 in the execution engine unit 736.

The execution engine unit 736 includes the rename/allocator unit 737 coupled to a retirement unit 738 and a set of one or more scheduler unit(s) 739. The scheduler unit(s) 739 represents any number of different schedulers, including reservations stations, central instruction window, etc. The scheduler unit(s) 739 is coupled to the physical register file(s) unit(s) 740. Each of the physical register file(s) units 740 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 740 is overlapped by the retirement unit 738 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 738 and the physical register file(s) unit(s) 740 are coupled to the execution cluster(s) 741. The execution cluster(s) 741 includes a set of one or more execution units 742 and a set of one or more memory access units 743. The execution units 742 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 739, physical register file(s) unit(s) 740, and execution cluster(s) 741 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 743). It should also be understood that where separate pipelines are used, one or more of these pipelines may be out-of-order issue/execution and the rest in-order.

The set of memory access units 743 is coupled to the memory unit 744, which includes a data TLB unit 745 coupled to a data cache unit 746 coupled to a level 2 (L2) cache unit 747. In one exemplary implementation, the memory access units 743 may include a load unit, a store address unit, and a store data unit, each of which is coupled to the data TLB unit 745 in the memory unit 744. The L2 cache unit 747 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 735 performs the decode stage 706; 3) the rename/allocator unit 737 performs the allocation stage 708 and renaming stage 710; 4) the scheduler unit(s) 739 performs the schedule stage 712; 5) the physical register file(s) unit(s) 740 and the memory unit 744 perform the register read/memory read stage 714; the execution cluster 741 perform the execute stage 716; 6) the memory unit 744 and the physical register file(s) unit(s) 740 perform the write back/memory write stage 718; 7) various units may be involved in the exception handling stage 722) the retirement unit 738 and the physical register file(s) unit(s) 740 perform the commit stage 724.

The core 748 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 732/746 and a shared L2 cache unit 747, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
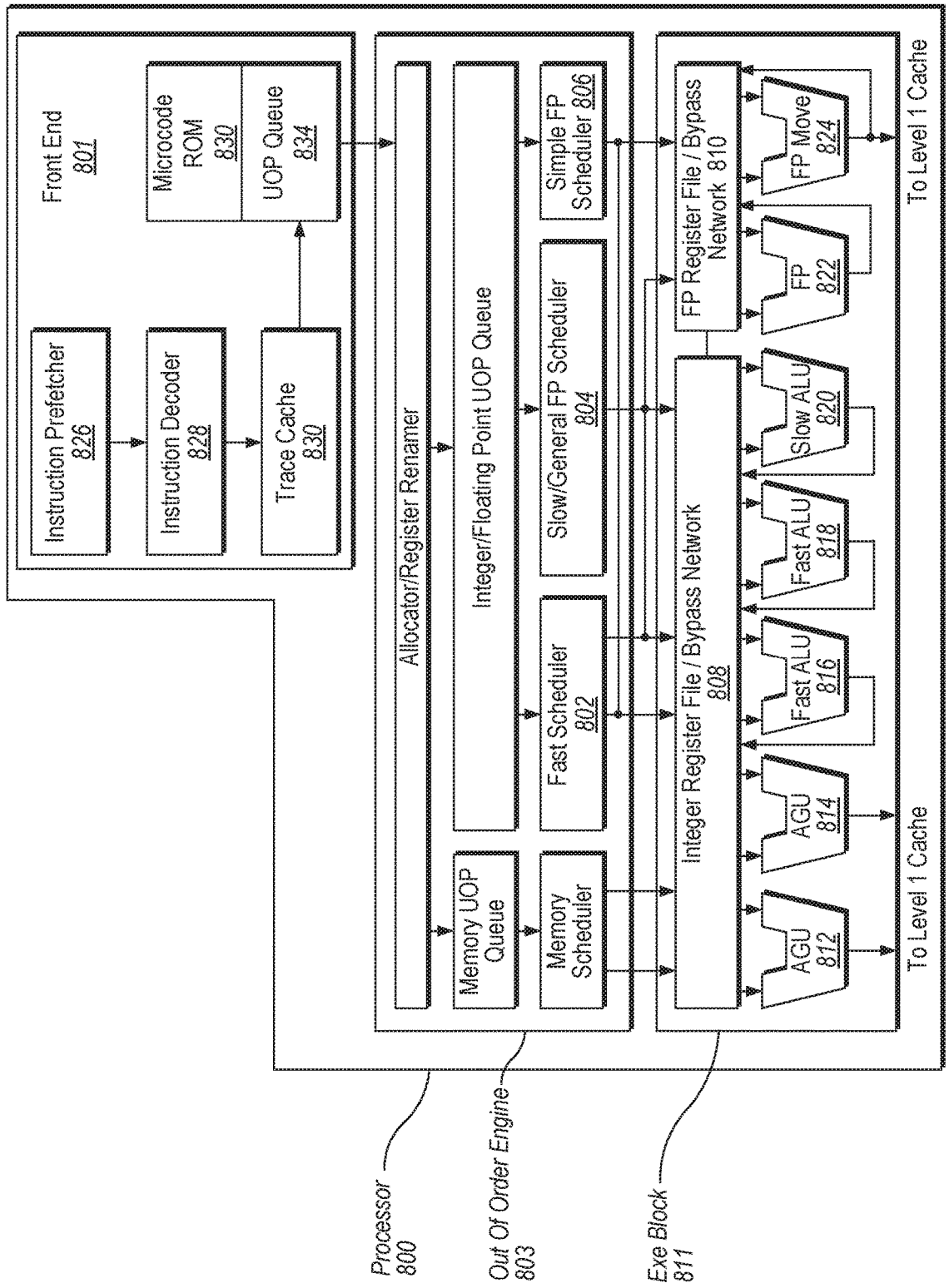
FIG. 8 illustrates a block diagram of the micro-architecture for a processing device that includes logic circuits to perform secure memory repartitioning according to one embodiment.

FIG. 8 illustrates a block diagram of the micro-architecture for a processing device 800 that includes logic circuits to perform secure memory repartitioning technologies according to one implementation. In some implementations, an instruction can be implemented to operate on data elements having sizes of byte, word, doubleword, quadword, etc., as well as datatypes, such as single and double precision integer and floating point datatypes. In one implementation the in-order front end 801 is the part of the processing device 800 that fetches instructions to be executed and prepares them to be used later in the processing device pipeline.

The front end 801 may include several units. In one implementation, the instruction prefetcher 816 fetches instructions from memory and feeds them to an instruction decoder 818 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction can be decoded into a small number of micro ops for processing at the instruction decoder 818. In another implementation, an instruction can be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation can schedule on each half of the main clock cycle while the other schedulers can only schedule once per main processing device clock cycle. The schedulers arbitrate for the dispatch ports to schedule uops for execution.

Register files 808, 810, sit between the schedulers 802, 804, 806, and the execution units 812, 814, 816, 818, 810, 812, 814 in the execution block 811. There is a separate register file 808, 810, for integer and floating point operations, respectively. Each register file 808, 810, of one implementation also includes a bypass network that can bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 810, 812, 814, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 810, floating point ALU 812, floating point move unit 814. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-ops. For implementations of the disclosure, instructions involving a floating point value may be handled with the floating point hardware.

In one implementation, the ALU operations go to the high-speed ALU execution units 816, 818. The fast ALUs 816, 818, of one implementation can execute fast operations with an effective latency of half a clock cycle. For one implementation, most complex integer operations go to the slow ALU 810 as the slow ALU 810 includes integer execution hardware for long latency type of operations, such as a multiplier, shifts, flag logic, and branch processing. Memory load/store operations are executed by the AGUs 812, 814. For one implementation, the integer ALUs 816, 818, 810, are described in the context of performing integer operations on 64 bit data operands. In alternative implementations, the ALUs 816, 818, 810, can be implemented to support a variety of data bits including 16, 32, 128, 256, etc. Similarly, the floating point units 812, 814, can be implemented to support a range of operands having bits of various widths. For one implementation, the floating point units 812, 814, can operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein can be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
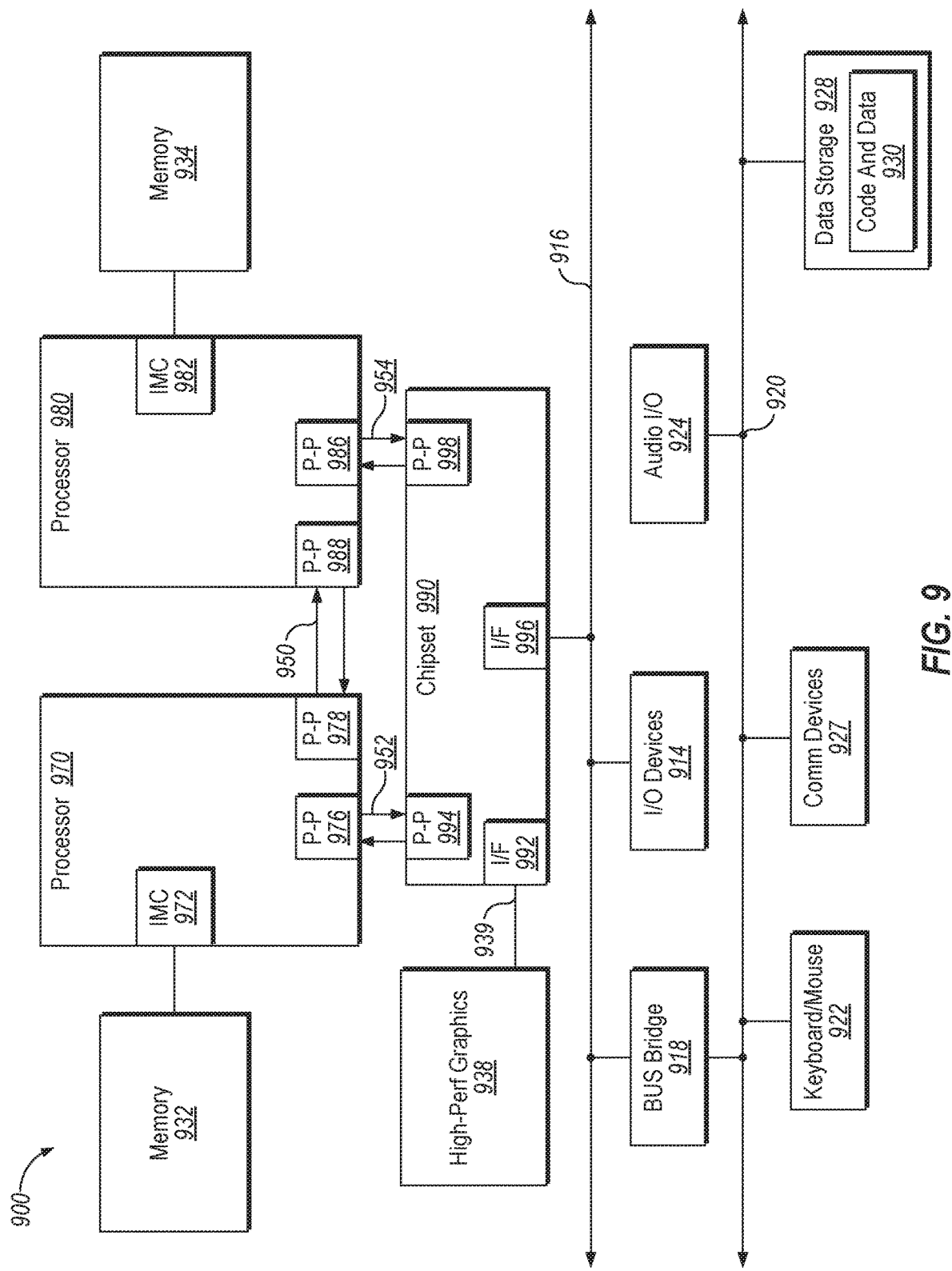
FIG. 9 is a block diagram of a computer system according to one implementation.

Embodiments may be implemented in many different system types. Referring now to FIG. 9, shown is a block diagram of a multiprocessing device system 900 in accordance with an implementation. As shown in FIG. 9, multi-processing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations of the secure memory repartitioning technologies can be implemented in the processing device 970, processing device 980, or both.

While shown with two processing devices 970, 980, it is to be understood that the scope of the disclosure is not so limited. In other implementations, one or more additional processing devices may be present in a given processing device.

Processing devices 970 and 980 are shown including integrated memory controller units 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processing devices 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 939.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
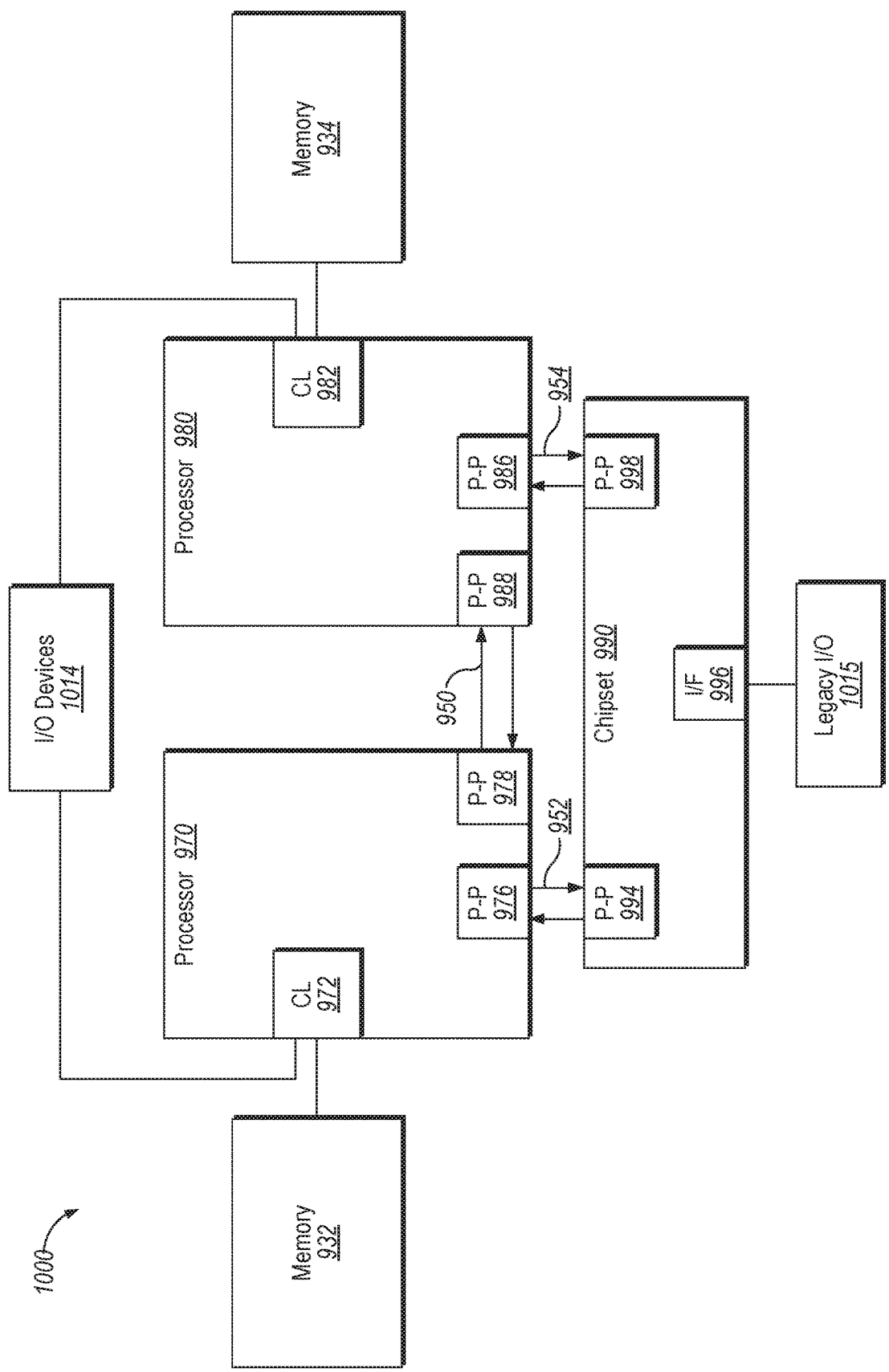
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates that the processing devices 970, 980 may include integrated memory and I/O control logic ("CL") 972 and 982, respectively. For at least one implementation, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 1014 are also coupled to the control logic 972, 982. Legacy I/O devices 1015 are coupled to the chipset 990. The implementations of the secure memory repartitioning technologies can be implemented in processing device 970, processing device 980, or both.

Figure 11:
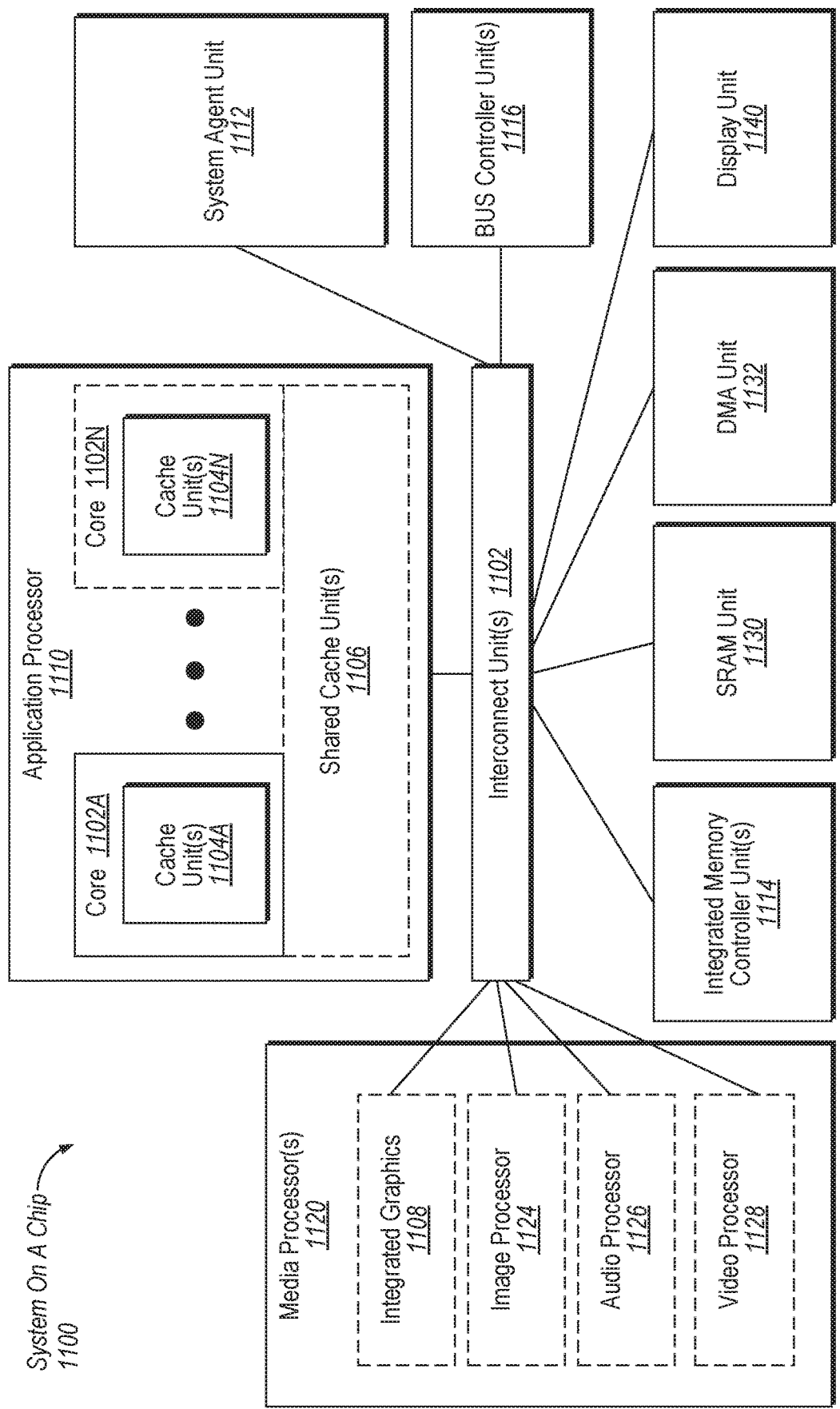
FIG. 11 is a block diagram of a system-on-a-chip according to one implementation.

FIG. 11 is an example system on a chip (SoC) that may include one or more of the cores 1102. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: an application processing device 1110 which includes a set of one or more cores 1102A-N and shared cache unit(s) 1106; a system agent unit 1112; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations of the secure memory repartitioning technologies can be implemented in SoC 1100.

Figure 12:
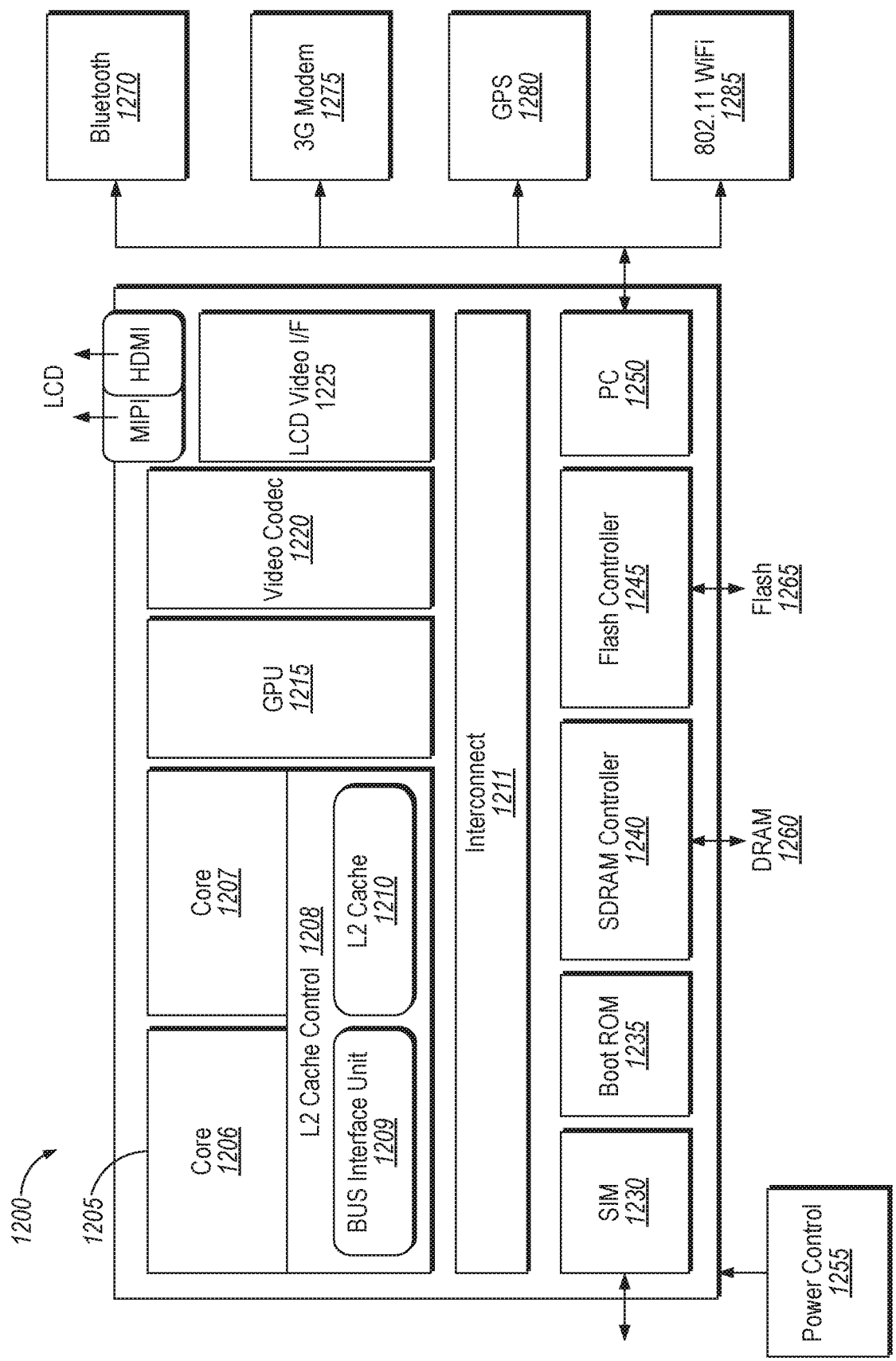
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The implementations of the secure memory repartitioning technologies can be implemented in SoC 1200.

Here, SoC 1220 includes 2 cores—1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which can implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included.

However, in a UE some form of a radio for external communication should be included.

Figure 13:
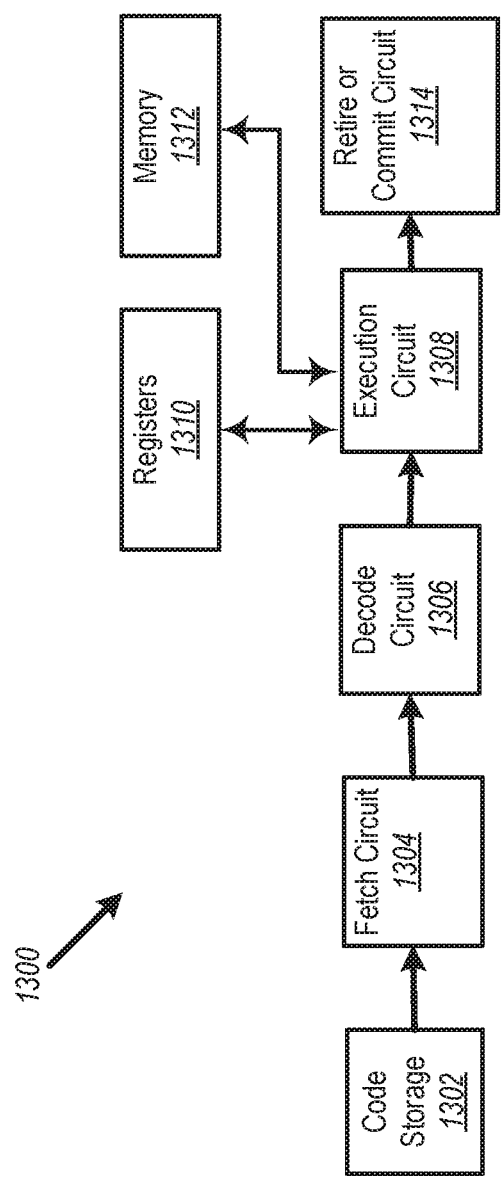
FIG. 13 is a block diagram of processing components for executing instructions.

FIG. 13 is a block diagram of processing components for executing instructions. As shown, computing system 1300 includes code storage 1302, fetch circuit 1304, decode circuit 1306, execution circuit 1308, registers 1310, memory 1312, and retire or commit circuit 1314. In operation, an instruction (e.g., EMKEPC, EPCALLOC, EREMOVE, EMKNONEPC) is to be fetched by fetch circuit 1304 from code storage 1302, which may comprise a cache memory, an on-chip memory, a memory on the same die as the processor, an instruction register, a general register, or system memory, without limitation. In one embodiment, the instruction may have a format similar to that of instruction 1500 in FIG. 15. After fetching the instruction from code storage 1302, decode circuit 1306 may decode the fetched instruction, including by parsing the various fields of the instruction. After decoding the fetched instruction, execution circuit 1308 is to execute the decoded instruction. In performing the step of executing the instruction, execution circuit 1308 may read data from and write data to registers 1310 and memory 1312. Registers 1310 may include a data register, an instruction register, a vector register, a mask register, a general register, an on-chip memory, a memory on the same die as the processor, or a memory in the same package as the processor, without limitation. Memory 1312 may include an on-chip memory, a memory on the same die as the processor, a memory in the same package as the processor, a cache memory, or system memory, without limitation. After the execution circuit executes the instruction, retire or commit circuit 1314 may retire the instruction, ensuring that execution results are written to or have been written to their destinations, and freeing up or releasing resources for later use.

Figure 14A:
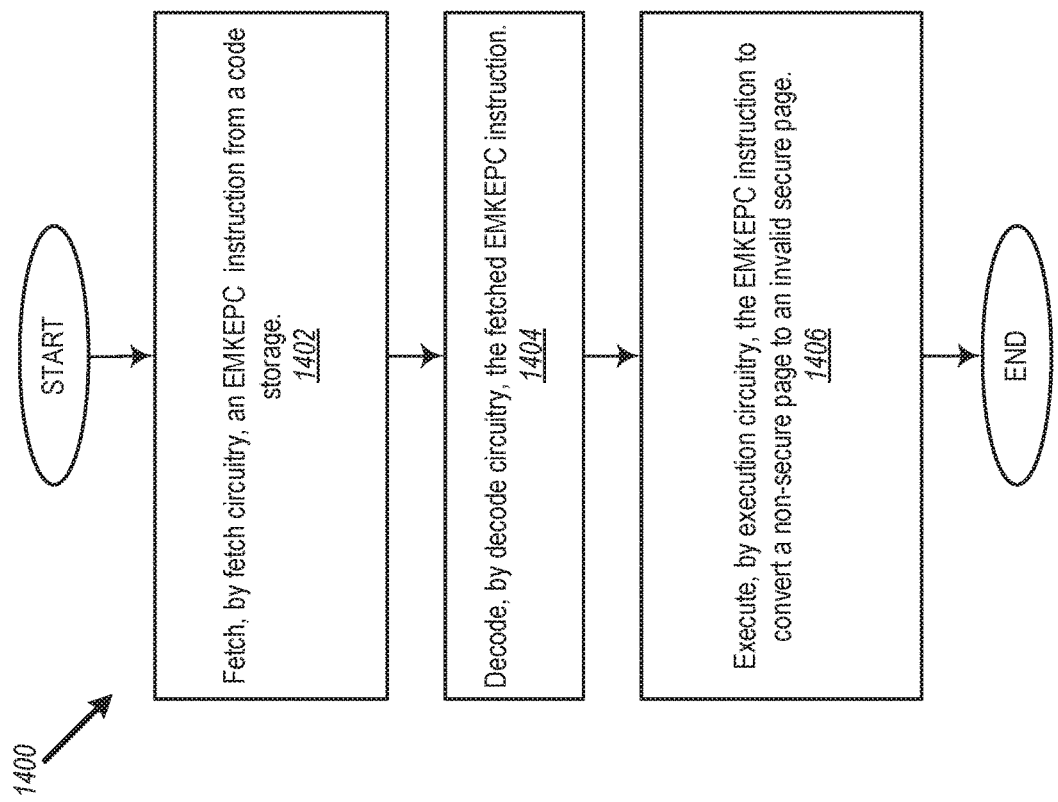
FIG. 14A is a flow diagram of an example method to be performed by a processor to execute an instruction to convert a non-secure page to an invalid secure page.

FIG. 14A is a flow diagram of an example method 1400 to be performed by a processor to execute an EMKEPC instruction to convert a non-secure page to an invalid secure page. After starting the process, a fetch circuit at block 1402 is to fetch the EMKEPC from a code storage. At optional block 1404, a decode circuit may decode the fetched EMKEPC instruction. At block 1406, an execution circuit is to execute the EMKEPC instruction to convert a non-secure page to an invalid secure page. The EMKEPC instruction may set the secure state bit in the secure state bit array associated with the page (e.g., BIT_ARRAY_4K 208) and may update any higher level secure state bit arrays (BIT_ARRAY_1 GB 212 and/or BIT_ARRAY_2 MB 210), accordingly.

Figure 14B:
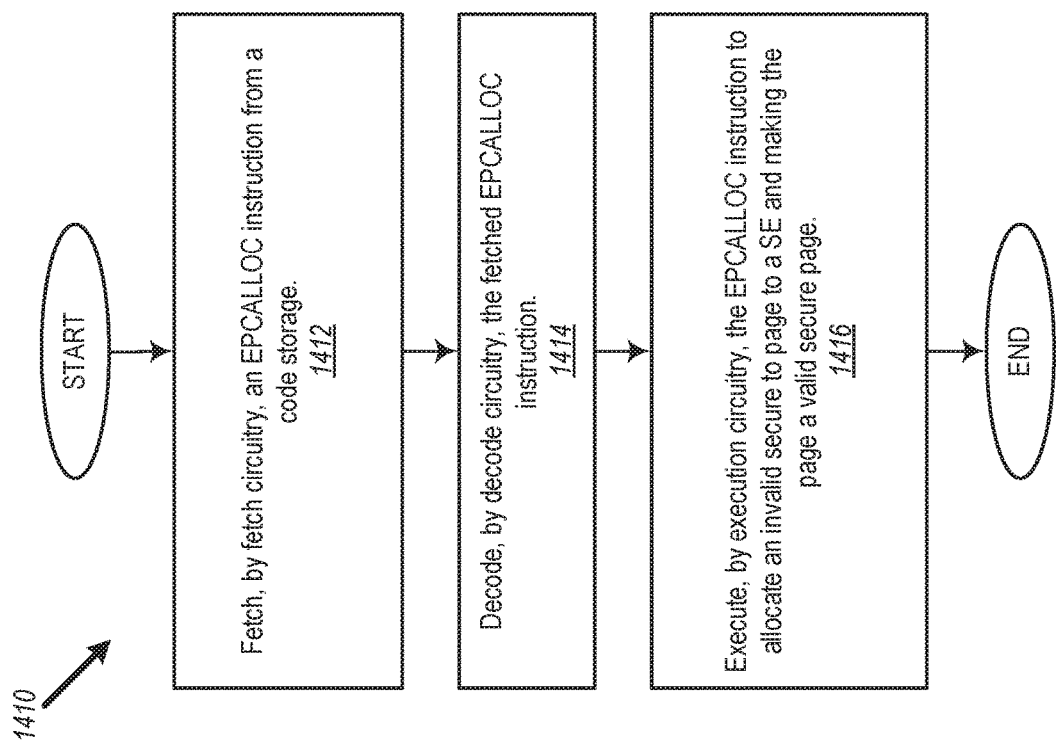
FIG. 14B is a flow diagram of an example method to be performed by a processor to execute an instruction to allocate an invalid secure page to a Secure Enclave.

FIG. 14B is a flow diagram of an example method 1410 to be performed by a processor to execute an instruction to allocate an invalid secure page to a Secure Enclave. EPCALLOC may set the valid state bit such that the page is now a valid secure page. After starting the process, a fetch circuit at block 1412 is to fetch the EPCALLOC instruction from a code storage. At optional block 1414, a decode circuit may decode the fetched EPCALLOC instruction. At block 1416, an execution circuit is to execute the EPCALLOC instruction to allocate an invalid secure page to an SE and setting the valid state bit to 1 so the page is a valid secure page.

Figure 14C:
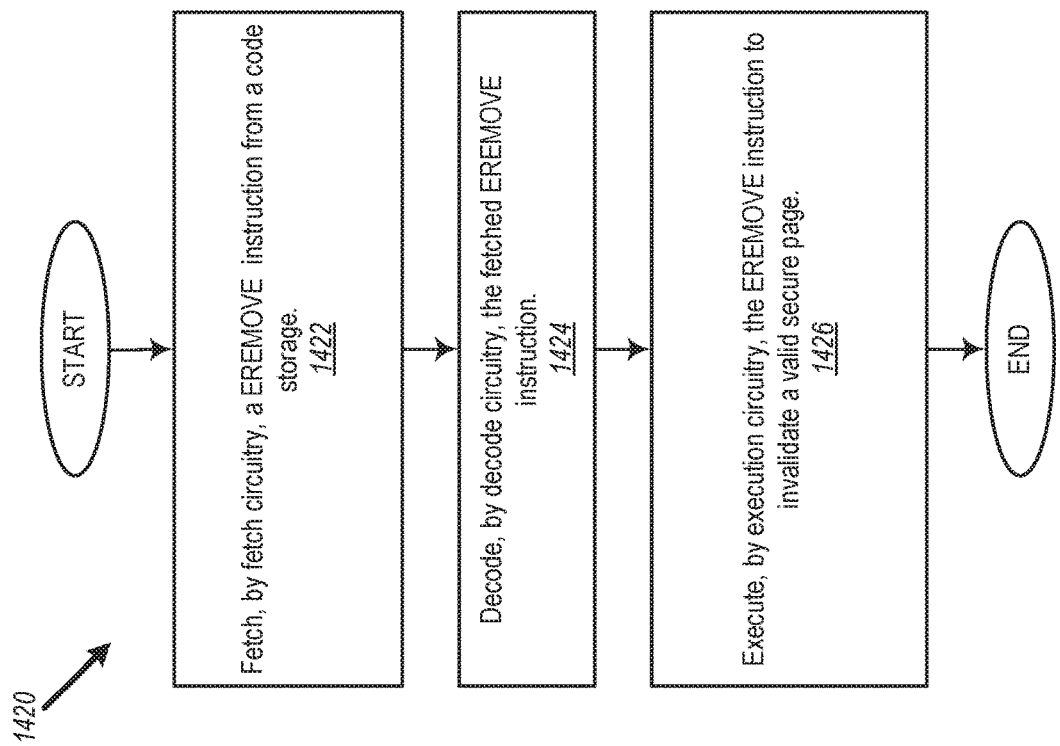
FIG. 14C is a flow diagram of an example method to be performed by a processor to execute a Secure Enclave instruction to invalidate a valid secure page.

FIG. 14C is a flow diagram of an example method 1420 to be performed by a processor to execute a Secure Enclave instruction (EREMOVE) to invalidate a valid secure page. After starting the process, a fetch circuit at block 1422 is to fetch the EREMOVE instruction from a code storage. At optional block 1424, a decode circuit may decode the fetched EREMOVE instruction. At block 1426, an execution circuit is to execute the EREMOVE instruction to invalidate a valid secure page. The valid state bit may be set to 0 and the page may now be an invalid secure page.

Figure 14D:
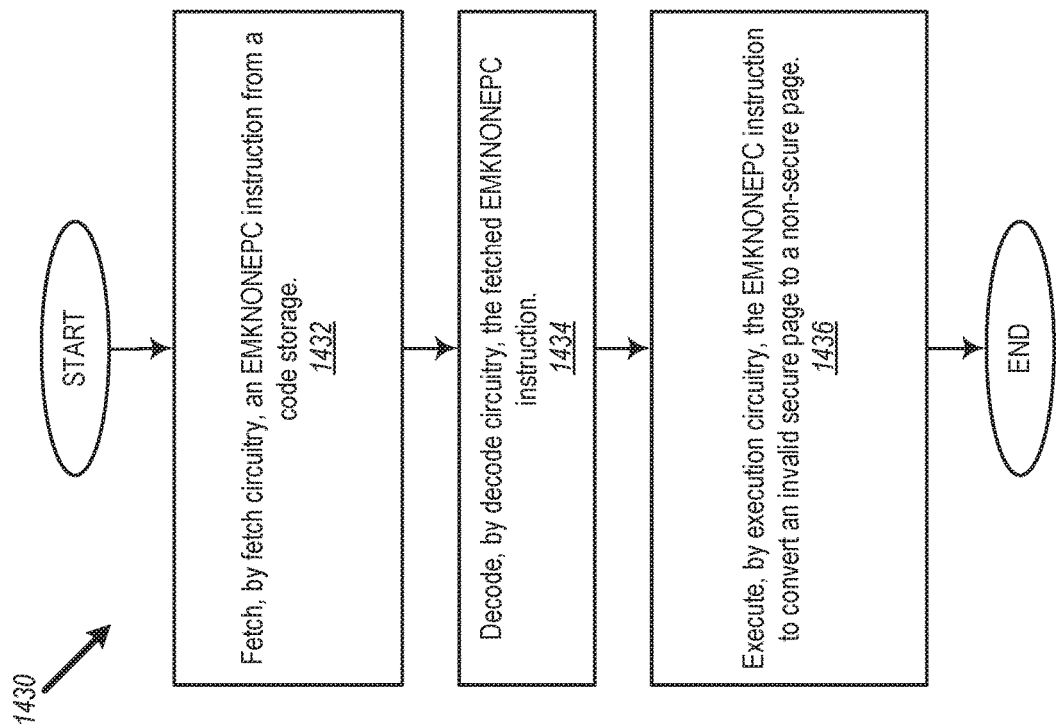
FIG. 14D is a flow diagram of an example method to be performed by a processor to execute an instruction to convert an invalid secure page to a non-secure page.

FIG. 14D is a flow diagram of an example method 1430 to be performed by a processor to execute an instruction to convert an invalid secure page to a non-secure page. After starting the process, a fetch circuit at block 1432 is to fetch the EMKNONEPC instruction from a code storage. At optional block 1434, a decode circuit may decode the fetched EMKNONEPC instruction. At block 1436, an execution circuit is to execute the EMKNONEPC instruction to convert an invalid secure page to a non-secure page. Executing the EMKNONEPC instruction may ensure a page address received in the EMKNONEPC instruction is properly aligned and not outside of data segment limit, ensure that the address points to a page mapped as read/write (RW), ensure that the address points to a page that is convertible to non-secure, verify that a valid state bit (V) is not set for the page, verify that a secure state bit (E) is set for the page by checking the secure state bit array associated with the page and/or the EPCM associated with the page.

Further, responsive to a determination that the secure page is an invalid secure page (e.g., V set to 0 and E set to 1), execution of the EMKNONEPC instruction may flush one or more cache lines to memory, for each 64-byte memory block starting at the address of the page (invalid secure page), send 0-size writes (microarchitecture operation codes) with a Guarded Attribute (GA) set to 1, and assign the GA to each memory transaction and the GA may be checked to decide on a cache hit. The GA may cause the 0-size write to be routed to the MEE 132 to enable the MEE 132 to reset the counters to the initialization value. Further, execution of the EMKNONEPC may set the secure state bit (E) to 0 in the secure state bit array (e.g., BIT_ARRAY_4 KB 208) associated with the page and the EPCM associated with the page (e.g., EPCM_4 KB).

Figure 15:
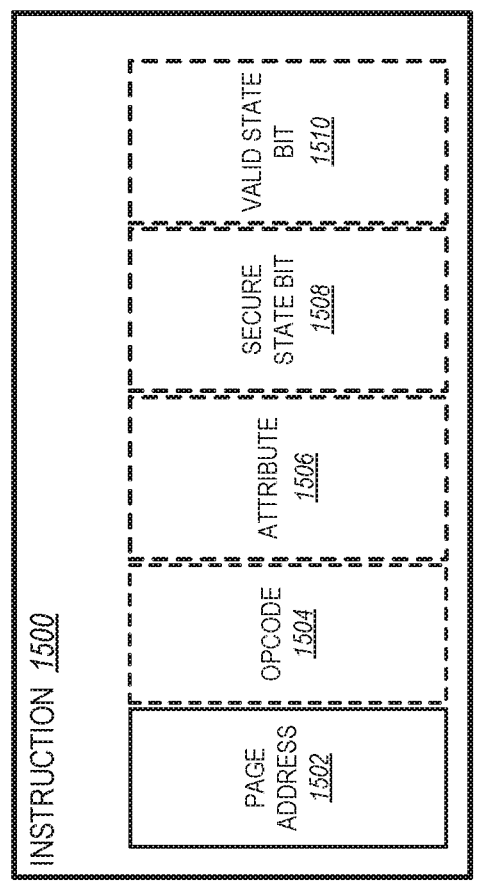
FIG. 15 is a block diagram illustrating an example format for instructions disclosed herein.

FIG. 15 is a block diagram illustrating an example format for instructions 1500 disclosed herein. The instruction 1500 may be EMKEPC, EPCALLOC, EREMOVE, or EMKNONEPC. The parameters in the format of the instruction 1500 may be different for EMKEPC, EPCALLOC, EREMOVE, or EMKNONEPC. As such, some of the parameters are depicted as optional with dashed lines. As shown, instruction 1500 includes a page address 1502, optional opcode 1504, optional attribute 1506, optional secure state bit 1508, and optional valid state bit 1510.

Page address 1502 may include a memory address of the target page on which to execute the instruction 1500. Optional opcode 1504 may be microarchitecture 0-size writes that are used by the EMKNONEPC instruction. Optional attribute 1506 may include a GA attribute that are used by the EMKNONEPC instruction. Optional secure state bit 1508 may include a value of 1 to set the secure state bit or a value of 0 to clear the secure state bit depending on the instruction 1500. Optional valid state bit 1510 may include a value of 1 to set the valid state bit or a value of 0 to clear the valid state bit depending on the instruction 1500.

Figure 16:
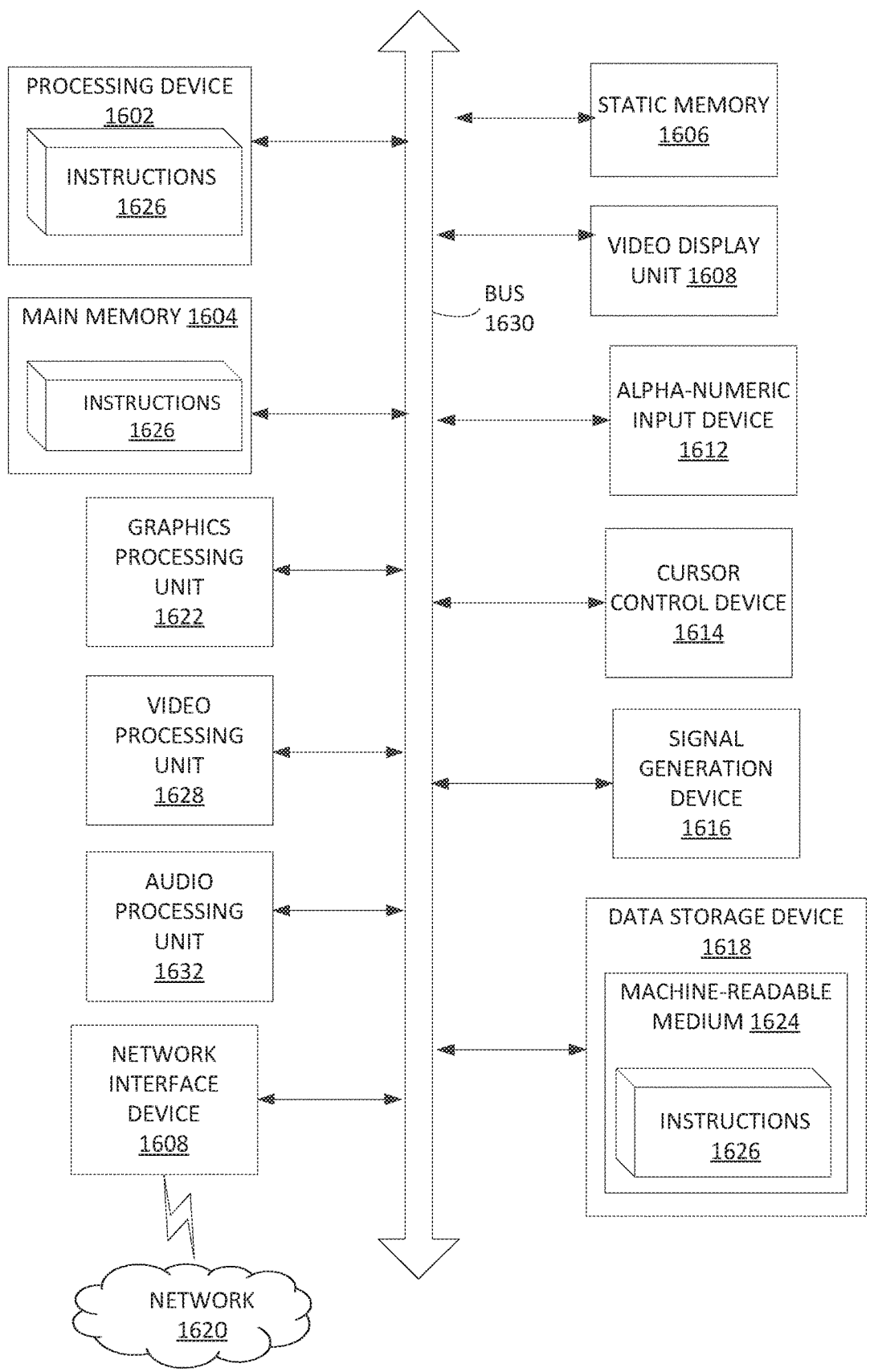
FIG. 16 illustrates another implementation of a block diagram for a computing system.

FIG. 16 illustrates a diagrammatic representation of a machine in the example form of a computing system 1600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections can be implemented in computing system 1600.

The computing system 1600 includes a processing device 1602, main memory 1604 (e.g., read-only memory (ROM), flash memory, dynamic random access memory (DRAM) (such as synchronous DRAM (SDRAM) or DRAM (RDRAM), etc.), a static memory 1606 (e.g., flash memory, static random access memory (SRAM), etc.), and a data storage device 1618, which communicate with each other via a bus 1630.

Processing device 1602 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1602 may also be one or more special-purpose processing devices such as an application specific integrated circuit (ASIC), a field programmable gate array (FPGA), a digital signal processing device (DSP), network processing device, or the like. In one implementation, processing device 1602 may include one or processing device cores. The processing device 1602 is configured to execute the processing logic 1626 for performing the operations discussed herein. In one implementation, processing device 1602 can be part of the computing system 100 of FIG. 1. Alternatively, the computing system 1600 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1600 may further include a network interface device 1608 communicably coupled to a network 1620. The computing system 1600 also may include a video display unit 1610 (e.g., a liquid crystal display (LCD) or a cathode ray tube (CRT)), an alphanumeric input device 1612 (e.g., a keyboard), a cursor control device 1614 (e.g., a mouse), a signal generation device 1616 (e.g., a speaker), or other peripheral devices. Furthermore, computing system 1600 may include a graphics processing unit 1622, a video processing unit 1628 and an audio processing unit 1632. In another implementation, the computing system 1600 may include a chipset (not illustrated), which refers to a group of integrated circuits, or chips, that are designed to work with the processing device 1602 and controls communications between the processing device 1602 and external devices. For example, the chipset may be a set of chips on a motherboard that links the processing device 1602 to very high-speed devices, such as main memory 1604 and graphic controllers, as well as linking the processing device 1602 to lower-speed peripheral buses of peripherals, such as USB, PCI or ISA buses.

The data storage device 1618 may include a computer-readable storage medium 1624 on which is stored software 1626 embodying any one or more of the methodologies of functions described herein. The software 1626 may also reside, completely or at least partially, within the main memory 1604 as instructions 1626 and/or within the processing device 1602 as processing logic 1626 during execution thereof by the computing system 1600; the main memory 1604 and the processing device 1602 also constituting computer-readable storage media.

The computer-readable storage medium 1624 may also be used to store instructions 1626 utilizing the processing device 1602, such as described with respect to FIGS. 1A and 1B, and/or a software library containing methods that call the above applications. While the computer-readable storage medium 1624 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further embodiments.

Example 1 is a processing device comprising: 1) a processor core and 2) a memory controller coupled between the processor core and a memory device, wherein the memory device comprises a memory range comprising a section of convertible pages that are convertible to secure pages or non-secure pages, and wherein the processor core is to: a) receive a non-secure access request to a page in the memory device; b) responsive to a determination, based on one or more secure state bits in one or more secure state bit arrays, that the page is a secure page, insert an abort page address into a translation lookaside buffer; and c) responsive to a determination, based on the one or more secure state bits in the one or more secure state bit arrays, that the page is a non-secure page, insert the page into the translation lookaside buffer.

In Example 2, in the processing device of Example 1, the one or more secure state bit arrays comprise a first secure state bit array including a plurality of secure state bits associated with a plurality of pages in the memory device, and each of the plurality of secure state bits indicate whether a respective page of the plurality of pages is secure or non-secure.

In Example 3, in the processing device of any of Examples 1-2, the determination, based on the one or more secure state bits in the one or more secure state bit arrays, that the page is the secure page comprises the processor core further to: a) determine that a first secure state bit of a first secure state bit array of the one or more secure state bit arrays indicates that a range of addresses comprises at least one secure page, wherein the range of addresses includes at least the page, wherein the first secure state bit is set based at least on a second secure state bit of a second secure state bit array of the one or more secure state bit arrays, and wherein the second secure state bit array comprises a plurality of secure state bits associated with a plurality of pages in the memory device; and b) determine that the second secure state bit in the second secure state bit array indicates that the page is the secure page.

In Example 4, in the processing device of any of Examples 1-3, the determination, based on the one or more secure state bits in the one or more secure state bit arrays, that the page is the non-secure page comprises the processor core further to: a) determine that a first secure state bit of a first secure state bit array of the one or more secure state bit arrays indicates that a range of addresses includes non-secure pages, wherein the range of addresses includes at least an address associated with the page, wherein the first secure state bit is set based at least on a second secure state bit in a second secure state bit array of the one or more secure state bit arrays, and wherein the second secure state bit is associated with the page.

In Example 5, in the processing device of any of Examples 1-4, the determination, based on the one or more secure state bits in the one or more secure state bit arrays, that the page is the secure page comprises the processor core further to: a) determine that a first secure state bit of a first secure state bit array of the one or more secure state bit arrays indicates that a first range of addresses includes at least a second range of addresses associated with a secure page, wherein the first secure state bit is set based at least on a second secure state bit of a second secure state bit array of the one or more secure state bit arrays, and wherein the second secure state bit indicates that the second range of addresses includes the secure page; b) determine that the second secure state bit of the second secure state bit array indicates that the second range of addresses includes at least one secure page, wherein the second range of addresses includes at least the page, wherein the second secure state bit is set based at least on a third secure state bit of a third secure state bit array of the one or more secure state bit arrays, and wherein the third secure state bit associated with the page; and c) determine that the third secure state bit in the third secure state bit array indicates that the page is the secure page.

In Example 6, in the processing device of any of Examples 1-5, the determination, based on the one or more secure state bits in the one or more secure state bit arrays, that the page is the non-secure page comprises the processor core further to: a) determine that a first secure state bit of a first secure state bit array of the one or more secure state bit arrays indicates that a first range of addresses includes a second range of addresses having non-secure pages, wherein the second range of addresses includes at least an address associated with the page, wherein the first secure state bit is set based at least on a second secure state bit of a second secure state bit array, wherein the second secure state bit is set based at least on a third secure state bit of a third secure state bit array, and wherein the third secure state bit is associated with the page and indicates the page is non-secure.

In Example 7, in the processing device of any of examples 1-6, the abort page address causes the processor core to: a) for a write access request, drop the write access request; and b) for a read access request, return a fixed pattern of data.

In Example 8, the processing device of any of Examples 1-7, further comprises a) a page miss handler and b) an IO memory management unit, and the one or more state bits are cached on the page miss handler and the IO memory management unit.

In Example 9, in the processing device of any of Examples 1-8, the one or more secure state bit arrays are separate from one or more secure metadata sections associated with the secure page.

In Example 10, in the processing device of any of Examples 1-9, the one or more secure state bit arrays are arranged in a hierarchical structure comprising a lowest secure state bit array at a lowest level and one or more higher secure state bit arrays at one or more higher levels, wherein the lowest secure state bit array comprises secure state bits associated with a plurality of pages and the one or more higher state bit arrays comprise secure state bits associated with a range of addresses.

In Example 11, the processing device of any of Examples 1-10, further comprises a) a memory encryption engine; and b) a prefetcher; and the processor core, responsive to the determination, based on the one or more secure state bits in the one or more secure state bit arrays, that the page is the secure page, is further to: a) execute an instruction to convert the secure page to a non-secure page; and b) responsive to receiving a non-secure write request to the non-secure page from an application, write to the non-secure page to create a modified non-secure page; and the memory encryption engine, responsive to receiving, from the prefetcher, a secure access request to the modified non-secure page, is to return a fixed pattern of data to the prefetcher to prevent system shutdown.

Various embodiments may have different combinations of the structural features described above. For instance, all optional features of the computing system described above may also be implemented with respect to the method or process described herein and specifics in the examples may be used anywhere in one or more embodiments.

In Example 12, a method comprising: 1) responsive to receiving, from a prefetcher of a processing device, a first secure access request to a secure page, providing access to the secure page to the prefetcher; 2) executing, via the processing device, an instruction to convert the secure page to a non-secure page; 3) responsive to receiving a non-secure write request to the non-secure page from an application, writing to the non-secure page to create a modified non-secure page in memory; and 4) responsive to receiving, from the prefetcher, a second secure access request to the modified non-secure page, returning, based on at least one counter set to an initialization value, a fixed pattern of data to the prefetcher to prevent system shutdown.

In Example 13, in the method of Example 12, executing the instruction to convert the secure page to the non-secure page comprises: 1) responsive to a determination that the secure page is an invalid secure page, flush one or more cache lines to the memory; 2) for each memory block starting at an address of the non-secure page, sending, to a memory encryption engine, a plurality of writes each including an operation code and an attribute, the operation code sets the at least one counter to the initialization value and the attribute ensures each of the plurality of writes are sent to the memory encryption engine; and 3) converting the invalid secure page to the non-secure page by setting a secure state bit in a secure state bit array to a value indicative of non-secure status.

In Example 14, in the method of any of Examples 12-13, the determination that the page is the invalid secure page comprises determining whether a valid bit is set to a value indicative of invalid status and whether the secure state bit is set to a value indicative of secure status.

In Example 15, in the method of any of Examples 12-14, the plurality of writes comprise 0-size writes that cause the memory encryption engine to set the at least one counter to the initialization value.

In Example 16, the method of any of Examples 12-15, further comprising, responsive to receiving a secure access request from the application, determining that the secure page is secure based on a secure state bit in a secure state bit array.

Various embodiments may have different combinations of the structural features described above. For instance, all optional features of the processing devices and methods described above may also be implemented with respect to a system described herein and specifics in the examples may be used anywhere in one or more embodiments.

Example 17 is a system comprising: 1) a memory device to store pages; and 2) a processing device operably coupled to the memory device, the processing device comprising a prefetcher and a memory encryption engine, and the processing device to: 1) responsive to receiving, from the prefetcher at the memory encryption engine, a first secure access request to a secure page of the pages, provide access to the secure page to the prefetcher; 2) executing an instruction to convert the secure page to a non-secure page; 3) responsive to receiving a non-secure write request to the non-secure page from an application, writing to the non-secure page to create a modified non-secure page in the memory device; and 4) responsive to receiving, from the prefetcher, a second secure access request to the modified non-secure page, return, via the memory encryption engine based on at least one counter set to an initialization value, a fixed pattern of data to the prefetcher to prevent system shutdown.

In Example 18, in the system of Example 17, executing the instruction to convert the secure page to the non-secure page comprises the processing device further to: a) responsive to a determination that the secure page is an invalid secure page, flush one or more cache lines to the memory device; b) for each memory block starting at an address of the invalid secure page, send, to the memory encryption engine, a plurality of writes each including an operation code and an attribute, the operation code sets the at least one counter to the initialization value and the attribute ensures each of the plurality of writes are sent to the memory encryption engine; and c) convert the invalid secure page to the non-secure page by setting a secure state bit in a secure state bit array to a value indicative of non-secure status.

In Example 19, in the system of any of Examples 17-18, the processing device is further to determine that the secure page is secure based on one or more secure state bits in one or more hierarchical secure state bit arrays that are cached in the processing device, at least one of the one or more secure state bits associated with the secure page and indicating that the secure page is secure.

In Example 20, in the system of any of Examples 17-19, the at least one counter set to the initialization value causes the memory encryption engine to return the fixed pattern of data without computing MACs.

Various embodiments may have different combinations of the operational features described above. For instance, all optional features of the method described above may also be implemented with respect to an integrated circuit. Specifics in the examples may be used anywhere in one or more embodiments.

Example 21 is an integrated circuit comprising: 1) a memory device to store pages; 2) a processing device operably coupled to the memory device, the processing device comprising a prefetcher and a memory encryption engine, and the processing device to: a) responsive to receiving, from the prefetcher at the memory encryption engine, a first secure access request to a secure page of the pages, provide access to the secure page to the prefetcher; b) execute an instruction to convert the secure page to a non-secure page; c) responsive to receiving a non-secure write request to the non-secure page from an application, write to the non-secure page to create a modified non-secure page in the memory device; and d) responsive to receiving, from the prefetcher, a second secure access request to the modified non-secure page, return, via the memory encryption engine based on at least one counter set to an initialization value, a fixed pattern of data to the prefetcher to prevent system shutdown.

In Example 22, in the integrated circuit of Example 21, executing the instruction to convert the secure page to the non-secure page comprises the processing device further to: a) responsive to a determination that the secure page is an invalid secure page, flush one or more cache lines to the memory device; b) for each memory block starting at an address of the non-secure page, send, to the memory encryption engine, a plurality of writes each including an operation code and an attribute, the operation code sets the at least one counter to the initialization value and the attribute ensures each of the plurality of writes are sent to the memory encryption engine; and c) convert the invalid secure page to the non-secure page by setting a secure state bit in a secure state bit array to a value indicative of non-secure status.

In Example 23, in the integrated circuit of any of Examples 21-22, the processing device is further to determine that the secure page is secure based on one or more secure state bits in one or more hierarchical secure state bit arrays that are cached in the processing device, at least one of the one or more secure state bits associated with the secure page and indicating that the secure page is secure.

In Example 24, in the integrated circuit of any of Examples 21-23, the at least one counter set to the initialization value causes the memory encryption engine to return the fixed pattern of data without computing MACs.

Various embodiments may have different combinations of the structural features described above. For instance, all optional features of the computing system described above may also be implemented with respect to another method or process described herein and specifics in the examples may be used anywhere in one or more embodiments.

Example 25 is a method for controlling memory access comprising 1) receiving a non-secure access request to a page in the memory device; 2) responsive to a determination, based on one or more secure state bits in one or more secure state bit arrays, that the page is a secure page, inserting an abort page address into a translation lookaside buffer; and 3) responsive to a determination, based on the one or more secure state bits in the one or more secure state bit arrays, that the page is a non-secure page, inserting the page into the translation lookaside buffer.

In Example 26, in the method for controlling memory access of Example 25, the one or more secure state bit arrays are arranged in a hierarchical structure comprising a lowest secure state bit array at a lowest level and one or more higher secure state bit arrays at one or more higher levels, wherein the lowest secure state bit array comprises secure state bits associated with a plurality of pages and the one or more higher state bit arrays comprise secure state bits associated with a range of addresses.

In Example 27, in the method for controlling memory access of Examples 25-26, the processing device comprises a page miss handler and an input/output (IO) memory management unit and the one or more state bits are cached on the page miss handler and the IO memory management unit.

Various embodiments may have different combinations of the operational features described above. For instance, all optional features of the method described above may also be implemented with respect to an apparatus. Specifics in the examples may be used anywhere in one or more embodiments.

Example 28 is an apparatus for controlling memory access comprising: 1) means for receiving a non-secure access request to a page in the memory device; 2) means for, responsive to a determination, based on one or more secure state bits in one or more secure state bit arrays, that the page is a secure page, inserting an abort page address into a translation lookaside buffer; and 3) means for, responsive to a determination, based on the one or more secure state bits in the one or more secure state bit arrays, that the page is a non-secure page, insert the page into the translation lookaside buffer.

In Example 29, the apparatus of Example 28, further comprising the subject matter of any of Examples 1-11 and 25-27.

Various embodiments may have different combinations of the operational features described above. For instance, all optional features of the method described above may also be implemented with respect to another apparatus. Specifics in the examples may be used anywhere in one or more embodiments.

Example 30 is an apparatus for returning a fixed pattern of data to prevent system shutdown comprising: 1) means for, responsive to receiving, from the prefetcher, a first secure access request to a secure page of the pages, providing access to the secure page to the prefetcher; 2) means for executing an instruction to convert the secure page to a non-secure page; 3) means for, responsive to receiving a non-secure write request to the non-secure page from an application, writing to the non-secure page to create a modified non-secure page in the memory device; and 4) means for, responsive to receiving, from the prefetcher, a second secure access request to the modified non-secure page, returning, based on at least one counter set to an initialization value, a fixed pattern of data to the prefetcher to prevent system shutdown.

In Example 31, the apparatus for returning a fixed pattern of data to prevent system shutdown of Example 30, further comprising subject matter of any of Examples 12-24.

Various embodiments may have different combinations of the operational features described above. For instance, all optional features of the method described above may also be implemented with respect to another system. Specifics in the examples may be used anywhere in one or more embodiments.

Example 32 is a system for controlling memory access comprising 1) a processor core; and 2) a memory controller is an apparatus comprising 1) a memory; and 2) a processing device coupled between the processor core and a memory device, wherein the memory device comprises a memory range comprising a section of convertible pages that are convertible to secure pages or non-secure pages, and wherein the processor core is to: a) receive a non-secure access request to a page in the memory device; b) responsive to a determination, based on one or more secure state bits in one or more secure state bit arrays, that the page is a secure page, insert an abort page address into a translation lookaside buffer; and c) responsive to a determination, based on the one or more secure state bits in the one or more secure state bit arrays, that the page is a non-secure page, insert the page into the translation lookaside buffer.

In Example 33, the system for controlling memory access of Example 32, further comprising subject matter of any of claims 2-11.

Various embodiments may have different combinations of the operational features described above. For instance, all optional features of the method described above may also be implemented with respect to another apparatus. Specifics in the examples may be used anywhere in one or more embodiments.

Example 34 is an apparatus comprising 1) a memory device; and 2) a processing device coupled to the memory device, wherein the processing device comprises the subject matter of any of claims 1-11.

In Example 35, the apparatus of Example 34, further comprising the subject matter of any of claims 25-27.

Various embodiments may have different combinations of the operational features described above. For instance, all optional features of the method described above may also be implemented with respect to another apparatus. Specifics in the examples may be used anywhere in one or more embodiments.

Example 36 is an apparatus comprising 1) a memory device; and 2) a processing device coupled to the memory device, wherein the processing device is to perform the method of any of claims 11-16.

In Example 37, the apparatus of Example 36, further comprising the subject matter of any of claims 17-24.

Various embodiments may have different combinations of the operational features described above. For instance, all optional features of the method described above may also be implemented with respect to a non-transitory, computer-readable storage medium. Specifics in the examples may be used anywhere in one or more embodiments.

Example 38 is a non-transitory machine-readable storage medium including instructions that, when executed by a processing device, cause the processing device to: 1) receive a non-secure access request to a page in a memory device; 2) responsive to a determination, based on one or more secure state bits in one or more secure state bit arrays, that the page is a secure page, insert an abort page address into a translation lookaside buffer; and 3) responsive to a determination, based on the one or more secure state bits in the one or more secure state bit arrays, that the page is a non-secure page, insert the page into the translation lookaside buffer.

In Example 39, in the non-transitory machine-readable storage medium of Example 38, the processing device is further to perform the method of any of Examples 25-27.

Various embodiments may have different combinations of the operational features described above. For instance, all optional features of the method described above may also be implemented with respect to another non-transitory, computer-readable storage medium. Specifics in the examples may be used anywhere in one or more embodiments.

Example 40 is a non-transitory machine-readable storage medium including instructions that, when executed by a processing device, cause the processing device to: 1) responsive to receiving, from a prefetcher of the processing device, a first secure access request to a secure page, provide access to the secure page to the prefetcher; 2) execute an instruction to convert the secure page to a non-secure page; 3) responsive to receiving a non-secure write request to the non-secure page from an application, write to the non-secure page to create a modified non-secure page in memory; and 4) responsive to receiving, from the prefetcher, a second secure access request to the modified non-secure page, return, based on at least one counter set to an initialization value, a fixed pattern of data to the prefetcher to prevent system shutdown.

In Example 41, in the non-transitory machine-readable storage medium of Example 40, the processing device is further to perform the method of any of Examples 12-16.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments are described with reference to secure memory repartitioning technologies in specific integrated circuits, such as in computing platforms or microprocessing devices. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processing device, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processing device or machine that performs data manipulations. However, the present disclosure is not limited to processing devices or machines that perform 512 bit, 256 bit, 128 bit, 64 bit, 32 bit, or 16 bit data operations and can be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processing device that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processing device comprising:
a processor core; and
a memory controller coupled between the processor core and a memory device, wherein the memory device comprises a memory range comprising a section of convertible pages that are convertible to secure pages or non-secure pages, and wherein the processor core is to:
receive a non-secure access request to a page in the memory device;
determine that a first secure state bit of a first secure state bit array of one or more secure state bit arrays indicates that a first range of addresses includes at least a second range of addresses associated with a secure page, wherein the first secure state bit is set based at least on a second secure state bit of a second secure state bit array of the one or more secure state bit arrays, and wherein the second secure state bit indicates that the second range of addresses includes the secure page;
determine that the second secure state bit of the second secure state bit array indicates that the second range of addresses includes at least one secure page, wherein the second range of addresses includes at least the page, wherein the second secure state bit is set based at least on a third secure state bit of a third secure state bit array of the one or more secure state bit arrays, and wherein the third secure state bit is associated with the page;
determine that the page is the secure page based on a determination that the third secure state bit in the third secure state bit array indicates that the page is the secure page; and
responsive to determining that the page is secure, insert an abort page address into a translation lookaside buffer.

2. The processing device of claim 1, wherein the one or more secure state bit arrays comprise a first secure state bit array including a plurality of secure state bits associated with a plurality of pages in the memory device, and each of the plurality of secure state bits indicate whether a respective page of the plurality of pages is secure or non-secure.

3. The processing device of claim 1 further comprising:
responsive to determining that the first secure state bit of the first secure state bit array of the one or more secure state bit arrays indicates that a range of addresses comprises non-secure pages, determine that the page is a non-secure page, wherein the range of addresses comprises at least an address associated with the page, wherein the first secure state bit is set based at least on a second secure state bit in a second secure state bit array of the one or more secure state bit arrays, and wherein the second secure state bit is associated with the page; and
responsive to determining that the page is a non-secure page, insert the page into a translation lookaside buffer.

4. The processing device of claim 1, wherein the abort page address causes the processor core to, for a write access request, drop the write access request.

5. The processing device of claim 1, wherein the abort page address causes the processor core to,
for a read access request, return a fixed pattern of data.

6. The processing device of claim 1, wherein a determination, based on the one or more secure state bits in the one or more secure state bit arrays, that the page is a non-secure page comprises the processor core further to:
determine that the first secure state bit of the first secure state bit array of the one or more secure state bit arrays indicates that the first range of addresses includes a second range of addresses having non-secure pages, wherein the second range of addresses includes at least an address associated with the page, wherein the first secure state bit is set based at least on the second secure state bit of the second secure state bit array, wherein the second secure state bit is set based at least on the third secure state bit of the third secure state bit array, and wherein the third secure state bit is associated with the page and indicates the page is non-secure.

7. The processing device of claim 1, wherein the processing device comprises a page miss handler and an input/output (IO) memory management unit and the one or more state bits are cached on the page miss handler and the IO memory management unit.

8. The processing device of claim 1, wherein the one or more secure state bit arrays are separate from one or more secure metadata sections associated with the secure page.

9. The processing device of claim 1, wherein the one or more secure state bit arrays are arranged in a hierarchical structure comprising a lowest secure state bit array at a lowest level and one or more higher secure state bit arrays at one or more higher levels, wherein the lowest secure state bit array comprises secure state bits associated with a plurality of pages and the one or more higher state bit arrays comprise secure state bits associated with a range of addresses.

10. The processing device of claim 1, wherein the processing device further comprises:
a memory encryption engine; and
a prefetcher; and
wherein the processor core, responsive to the determination, based on the one or more secure state bits in the one or more secure state bit arrays, that the page is the secure page, is further to:
execute an instruction to convert the secure page to a non-secure page;
responsive to receiving a non-secure write request to the non-secure page from an application, write to the non-secure page to create a modified non-secure page; and
wherein the memory encryption engine, responsive to receiving, from the prefetcher, a secure access request to the modified non-secure page, is to return a fixed pattern of data to the prefetcher to prevent system shutdown.

11. The processing device of claim 10, wherein the memory encryption engine is to return the fixed pattern of data without computing a message authentication code.

12. A method, comprising:
responsive to receiving, from a prefetcher of a processing device, a first secure access request to a secure page, providing access to the secure page to the prefetcher;
executing, via the processing device, an instruction to convert the secure page to a non- secure page, wherein the executing comprises:
responsive to a determination that the secure page is an invalid secure page, flush one or more cache lines to memory, and
converting the invalid secure page to the non-secure page by setting a secure state bit in a secure state bit array to a value indicative of non-secure status;
responsive to receiving a non-secure write request to the non-secure page from an application, writing to the non-secure page to create a modified non-secure page in memory; and
responsive to receiving, from the prefetcher, a second secure access request to the modified non-secure page, returning, based on at least one counter set to an initialization value, a fixed pattern of data to the prefetcher to prevent system shutdown.

13. The method of claim 12, wherein executing the instruction further comprises:
for each memory block starting at an address of the invalid secure page, sending, to a memory encryption engine, a plurality of writes including an attribute, the attribute causing each of the plurality of writes to be sent to the memory encryption engine to cause the memory encryption engine to set the at least one counter to the initialization value.

14. The method of claim 13, wherein the plurality of writes are 0-size writes that cause the memory encryption engine to set the at least one counter to the initialization value.

15. The method of claim 12, wherein the determination that the page is the invalid secure page comprises determining whether a valid bit is set to a value indicative of invalid status and whether the secure state bit is set to a value indicative of secure status.

16. The method of claim 12, further comprising, responsive to receiving a secure access request from the application, determining that the secure page is secure based on the secure state bit in the secure state bit array.

17. A system comprising:
a memory device to store pages; and
a processing device operably coupled to the memory device, the processing device comprising a prefetcher and a memory encryption engine, and the processing device to:
responsive to receiving, from the prefetcher at the memory encryption engine, a first secure access request to a secure page of the pages, provide access to the secure page to the prefetcher;

execute an instruction to convert the secure page to a non-secure page;

responsive to receiving a non-secure write request to the non-secure page from an application, write to the non-secure page to create a modified non-secure page in the memory device; and responsive to receiving, from the prefetcher, a second secure access request to the modified non-secure page, return, via the memory encryption engine based on at least one counter set to an initialization value, a fixed pattern of data to the prefetcher to prevent system shutdown.

18. The system of claim 17, wherein executing the instruction to convert the secure page to the non-secure page comprises the processing device further to:

responsive to a determination that the secure page is an invalid secure page, flush one or more cache lines to the memory device;

for each memory block starting at an address of the invalid secure page, send, to the memory encryption engine, a plurality of writes each including an operation code and an attribute, the operation code sets the at least one counter to the initialization value and the attribute ensures each of the plurality of writes are sent to the memory encryption engine; and convert the invalid secure page to the non-secure page by setting a secure state bit in a secure state bit array to a value indicative of non-secure status.

19. The system of claim 18, wherein the plurality of writes are 0-size write.

20. The system of claim 17, wherein the at least one counter set to the initialization value causes the memory encryption engine to return the fixed pattern of data without computing a message authentication code.

* * * * *